Jan. 25, 1949.　　　　C. F. ROBBINS　　　2,460,034
ELECTRIC SWITCH
Filed July 4, 1942　　　　　　　　　　　　6 Sheets-Sheet 1
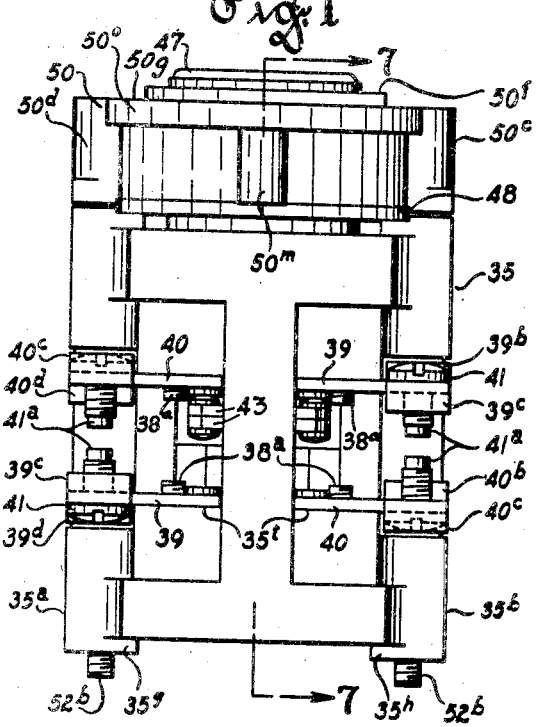
Fig. 1
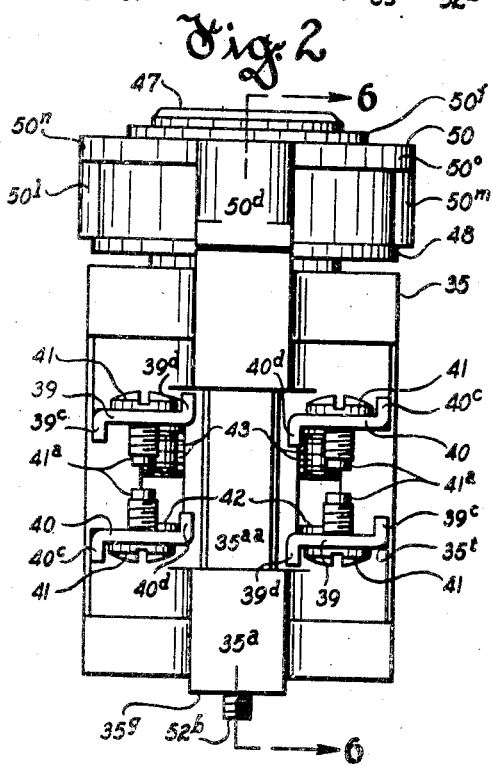
Fig. 2
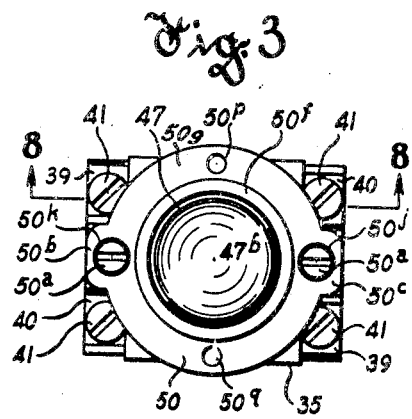
Fig. 3
Fig. 4
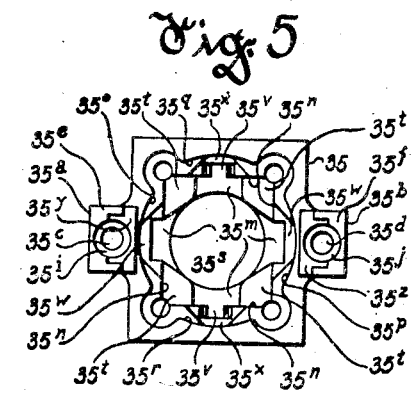
Fig. 5
Inventor
Clyde F. Robbins
By Frank H. Hubbard
Attorney Jan. 25, 1949.  C. F. ROBBINS  2,460,034
ELECTRIC SWITCH
Filed July 4, 1942  6 Sheets-Sheet 2
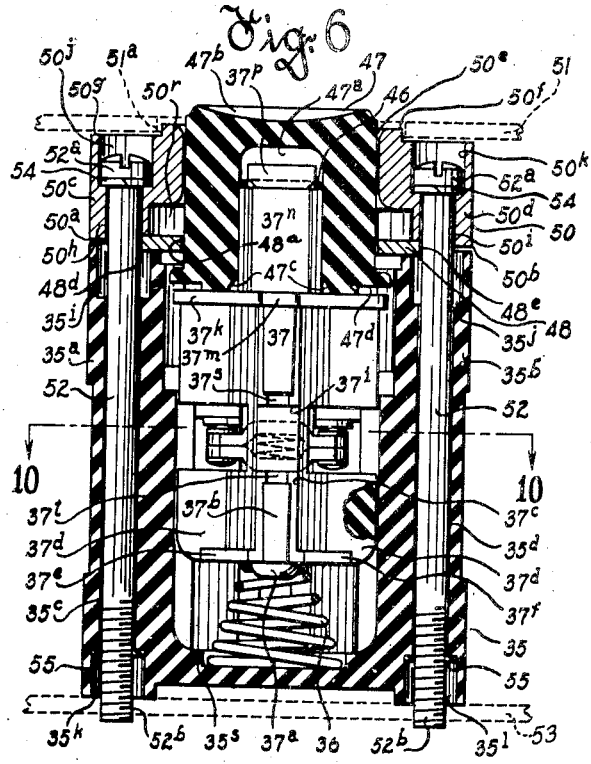
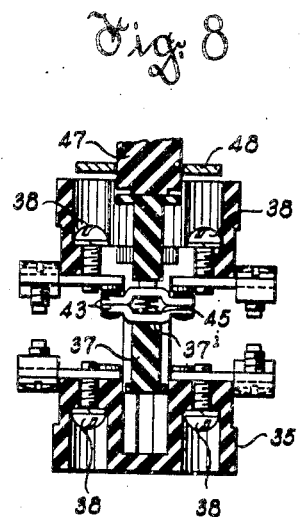
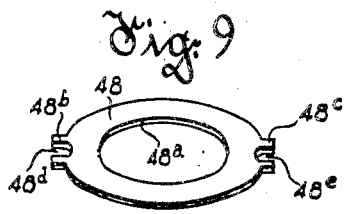
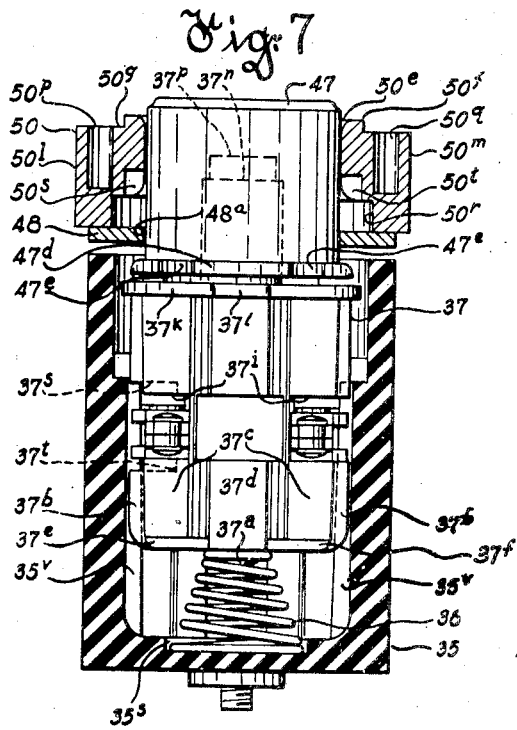
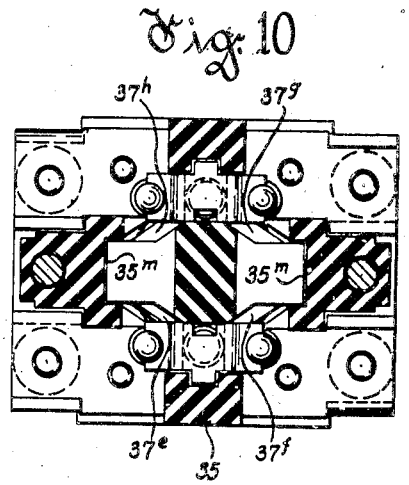
Inventor
Clyde F. Robbins
By Frank H. Hubbard
Attorney Jan. 25, 1949.  C. F. ROBBINS  2,460,034
ELECTRIC SWITCH Filed July 4, 1942  6 Sheets-Sheet 3

Inventor
Clyde F. Robbins
By Frank H. Hubbard
Attorney

Jan. 25, 1949.    C. F. ROBBINS    2,460,034
ELECTRIC SWITCH

Filed July 4, 1942    6 Sheets-Sheet 4

Inventor
Clyde F. Robbins
By Frank H. Hubbard
Attorney

Jan. 25, 1949.  C. F. ROBBINS  2,460,034
ELECTRIC SWITCH
Filed July 4, 1942  6 Sheets-Sheet 5
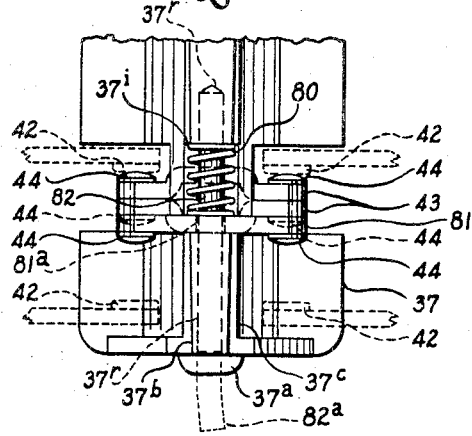
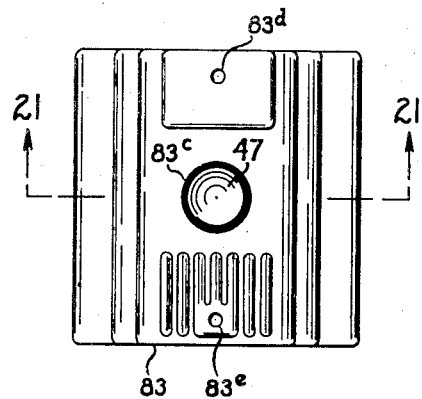
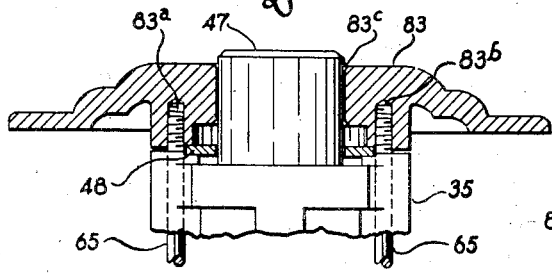
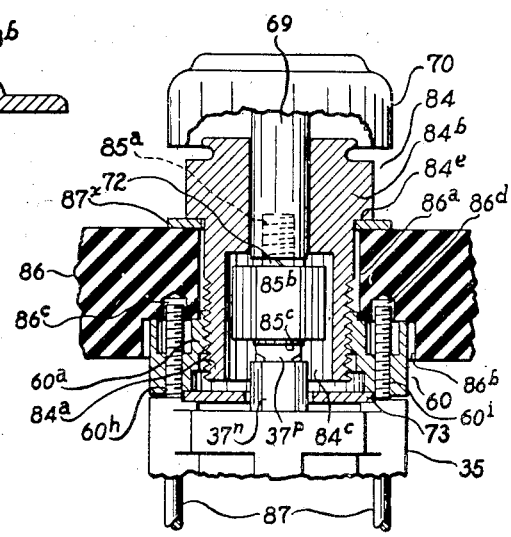
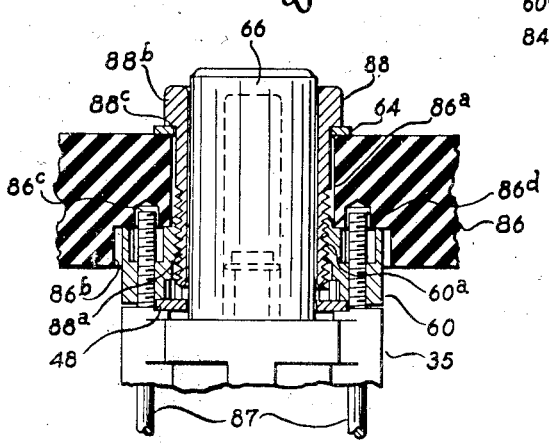
Inventor
Clyde F. Robbins
By Frank H. Hubbard
Attorney Jan. 25, 1949.  C. F. ROBBINS  2,460,034
ELECTRIC SWITCH
Filed July 4, 1942  6 Sheets-Sheet 6
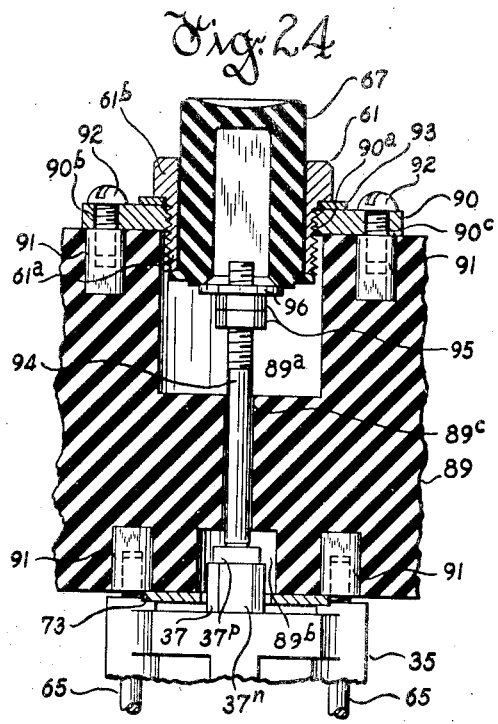
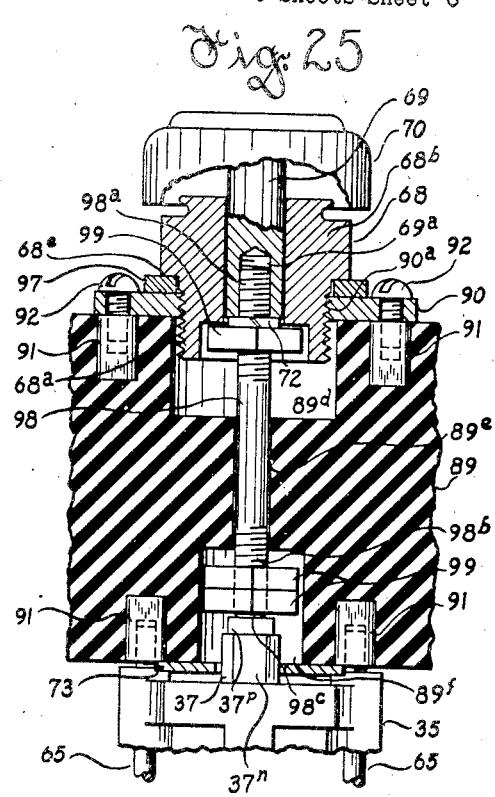
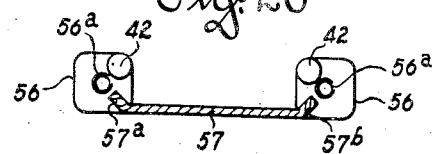
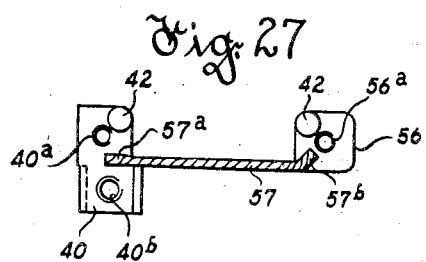
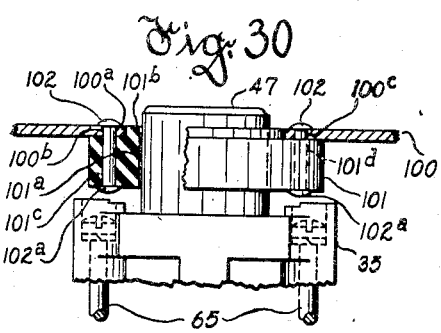
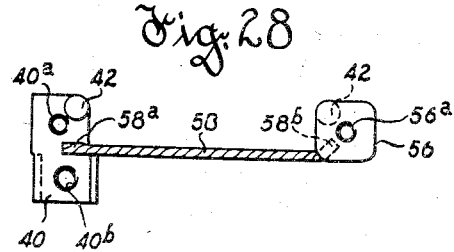
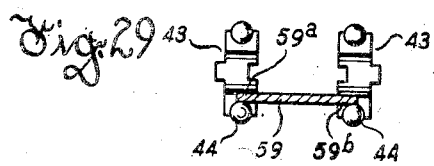
Inventor
Clyde F. Robbins
By Frank H. Hubbard
Attorney Patented Jan. 25, 1949

2,460,034

UNITED STATES PATENT OFFICE 2,460,034

ELECTRIC SWITCH

Clyde F. Robbins, Milwaukee, Wis., assignor to Cutler-Hammer, Inc., Milwaukee, Wis., a corporation of Delaware Application July 4, 1942, Serial No. 449,756

27 Claims. (Cl. 200—16)

This invention relates to improvements in electric switches. Although not limited thereto, the invention relates more particularly to improvements in switches of the heavy-duty pushbutton type.

A primary object of the invention is to improve and simplify the construction and assembly of the parts and the operation of switches of the aforementioned character.

Another object is to minimize the number of different parts required to provide switches of the aforementioned character having various different electrical characteristics.

Another object is to provide various novel and simple forms of adapters for use with my improved switch mechanism whereby the latter is adapted for various forms of mountings, such as base mounting, one-hole mounting, cover mounting, and various thicknesses of panel mounting.

Another object is to provide a novel and simple interlocking relationship of the stationary and movable parts of the switch whereby the latter are retained in proper relationship as an incident to assembly of the former.

Another object is to provide a novel form of one-piece molded insulating base adapted to accommodate all of the various combinations of stationary and movable contact elements herein contemplated.

Another object is to provide a novel form of one-piece molded insulating plunger for use in conjunction with said base, and contactors of novel form for association with said plunger and with the stationary contacts of the switch.

Another object is to provide for use of one or two pairs of contactors, and to provide a novel form of lost motion driving connection between the plunger and each pair of contactors carried thereby.

Another object is to provide novel forms of bus connections between certain of the stationary contacts and/or between certain of the contactors of the switch to modify the circuit commutating characteristics of the latter.

Another object is to provide a switch mechanism of the aforementioned character wherein adequate electrical clearance between live parts of opposite polarity is insured.

Another object is to provide novel forms of combined stationary contact and terminal members to provide for either top or bottom wiring, or both, of the switch.

Another and more specific object of the invention is to provide a switch of the aforementioned character employing one or two pairs of contactors, and from two up to eight combined stationary contact and terminal members for co-operation therewith.

Another object is to facilitate disassembly of the various switch parts at will, to provide for replacement or rearrangement thereof if necessary or desired.

Another object is to improve the appearance of such switches, and to increase the adaptability of the parts to provide the various desired combinations.

Another object is to provide a novel form of mushroom-head type operator for switches of the character herein contemplated.

Another object is to provide for use of eight identical combined contact and terminal members, adapted for either bottom or top wiring, where the upper and lower groups of wiring terminal portions are not required to overlie each other because of space limitations.

Another object is to provide for use of wiring terminal members all of which are of identical form, the stationary contact tips of silver or similar material being merely applied to said terminal members at different points, respectively, to provide right-hand and left-hand assemblies for use where upper and lower groups of terminal portions are required to overlie each other within the greatest transverse dimensions of the base.

Another object is to provide a novel form of wiring terminal member which affords a wire beard guard for cooperation with the head of the binding screw regardless of the direction of insertion of the screw shank.

Another object is to provide a binding screw the end of whose shank is of substantially reduced diameter, to facilitate insertion and threading thereof into the tapped opening in the terminal member.

Various other objects and advantages of the invention will become apparent as the description proceeds.

The accompanying drawings illustrate various combinations of switch elements constructed and arranged in accordance with my invention, it being understood that an almost infinite number of other combinations of the switch elements may be provided to afford the particular circuit commutating characteristics desired.

In the drawings,

Figure 1 is a side elevational view (enlarged to one and one-half times normal scale) of a heavy duty pushbutton switch constructed in accordance with my invention, and adapted for base mounting; the four upper terminals being arranged for top wiring, and the four lower terminals being arranged for bottom wiring.

Fig. 2 is an elevational view at a right angle to that of Fig. 1.

Fig. 3 is a top plan view of the switch, actual size.

Fig. 4 is a bottom plan view of the switch shown in Figs. 1 to 3.

Fig. 5 is a top plan view of the one-piece molded insulating base of the switch, showing the relative simplicity thereof when compared with its multiplex utility, as hereinafter set forth.

Fig. 6 is a vertical sectional view, on the line 6—6 of Fig. 2, one pair of contactors and their associated spring being omitted, for purposes of illustration; certain of the switch parts being shown in elevation, and portions of the enclosing casing or housing being shown in dotted lines.

Fig. 7 is a vertical sectional view, on the line 7—7 of Fig. 1, with certain of the switch parts shown in elevation.

Fig. 8 is a fragmentary vertical sectional view, on the line 8—8 of Fig. 3, with certain of the switch parts shown in elevation for clarity of illustration.

Fig. 9 is a perspective view of the flat, punched sheet metal plate which assists in guiding the pushbutton and positively limits the degree of outward movement of the latter.

Fig. 10 is a transverse sectional view, on the line 10—10 of Fig. 6, certain of the parts being shown in elevation.

Figure 11:
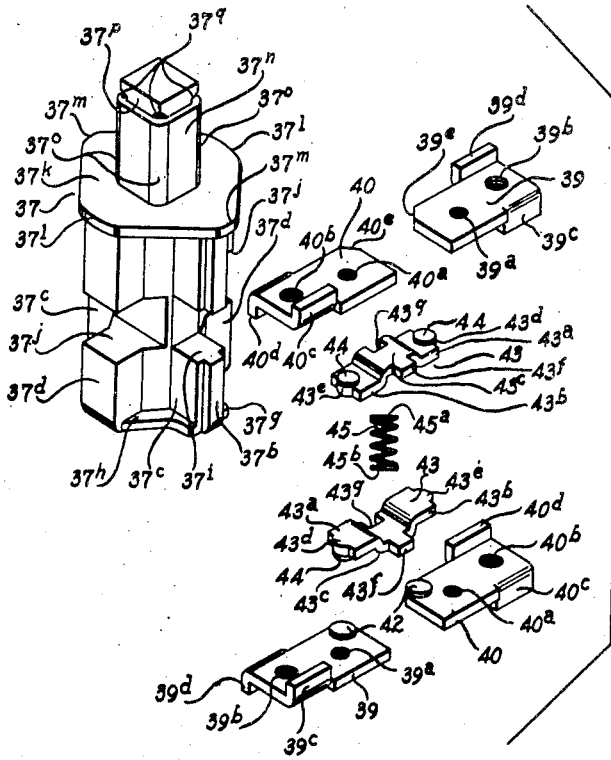
Fig. 11 is an exploded perspective view showing the one-piece molded insulating plunger, one pair of spring-pressed contactors to be carried thereby, and the pairs of upper and lower combined stationary contact and terminal members for cooperative engagement by the contactors selectively.

Fig. 19 is a fragmentary side elevational view of a portion of a plunger having a single, flat downwardly spring-pressed contactor at one side thereof, and a pair of spring-pressed contactors of the form hereinbefore disclosed arranged at the other side thereof, certain of the stationary contacts being shown in dotted lines, said plunger being drilled vertically upwardly and a pin being forcibly inserted into the drilled cavity to retain the perforated single contactor and its associated spring in assembled position.

Fig. 20 is a top plan view of a cast metal flush plate, to the inner surface of which a pushbutton switch may be attached.

Fig. 21 is a vertical sectional view, on the line 21—21 of Fig. 20, showing the manner of attaching the switch base to the flush plate, a fragment only of the base being illustrated.

Fig. 22 is a vertical sectional view of the adapter elements employed for attaching a switch, having a mushroom head type of operator, to supporting panels up to two inches in thickness, a fragment of the switch base being shown in elevation.

Fig. 23 is a view similar to Fig. 22, but showing the adapter elements employed for attaching a pushbutton type of switch to panels up to two inches in thickness.

Fig. 24 is a vertical sectional view similar to Figs. 22 and 23, but showing a special form and arrangement of adapter elements for attachment of pushbutton type switches to panels having thicknesses of two inches or more.

Fig. 25 is a vertical sectional view quite similar to that of Fig. 24, but showing the adapter elements for attachment of a switch having a mushroom head type of operator to a panel of two inches or more in thickness.

Figs. 26, 27 and 28 illustrate various combinations of stationary contacts and/or contact and wiring terminal members with bus connections therebetween to provide the desired circuit commutations by switches employing the same.

Fig. 29 illustrates two upper or lower contactors of two pairs, showing the manner of effecting a bus connection therebetween, and Fig. 30 is a fragmentary view, partly in side elevation and partly in vertical section, showing a molded insulating adapter ring attached to a panel or cover member to assist in guiding the reciprocatory movements of the pushbutton of a base mounted switch, and to restrain the pushbutton against complete outward displacement.

Referring first to the base mounted switch illustrated in Figs. 1 to 11, inclusive, the numeral 35 designates the one-piece molded insulating base, which is common to all forms of switches herein contemplated. Base 35 is adapted to be produced in a suitable multi-part hot-molding die (not shown). The molding material employed preferably consists of a very high grade "Bakelite" composition, although lower grades of "Bakelite" or other similar compositions may be employed if desired.

Base 35 is of substantially rectangular form in transverse cross section, except that the same is provided at the two longer sides thereof with a pair of symmetrically arranged integral lateral extensions $35^a$ and $35^b$ which are provided with bolt holes or passages $35^c$ and $35^d$ formed therein by the molding operation. Extensions $35^a$ and $35^b$ respectively project upwardly beyond the main body of base 35, as shown at $35^e$ and $35^f$ in Fig. 5, and downwardly beyond said main body, as shown at 35ᵍ and 35ʰ. Opposite end portions of passages 35ᶜ and 35ᵈ are enlarged to provide countersinks 35ⁱ, 35ʲ (see Fig. 5) and 35ᵏ, 35ˡ (see Fig. 4); the countersinks 35ⁱ and 35ʲ being adapted to accommodate bolt heads or nuts (as shown in Fig. 30, for instance). As shown in dotted lines in Fig. 15, the countersinks 35ᵏ and 35ˡ are adapted to accommodate the heads of bolts which attach base 35 to adapter members employed in the one-hole mounting types of switches.

Base 35 is provided with an upwardly opening recess the lower portion of which is of approximately cruciform in transverse cross section, as indicated at 35ᵐ in Fig. 5; the intermediate portion of which recess is of substantially rectangular form in transverse cross section, as indicated by the four sides thereof designated by the numerals 35ⁿ; and the upper portion of which recess is of approximately circular form in transverse cross section, as indicated by the pairs of opposed segmental walls 35ᵒ, 35ᵖ and 35ᵠ, 35ʳ. It is to be noted, however, that the walls 35ᵠ and 35ʳ are segments of a larger circle than that defined by the walls 35ᵒ and 35ᵖ. By this means said upper end portion of the recess is adapted to accommodate the pushbuttons herein disclosed, the lower ends of which have substantially circular flanges of a diameter slightly less than that of the circle defined by walls 35ᵒ and 35ᵖ, in any one of four different rotary positions spaced ninety degrees from each other; whereas certain types of cam-operated or cam-locked switches (not shown herein) have pushbuttons with opposed flange portions only slightly less in diameter than the diameter of the circle defined by walls 35ᵠ and 35ʳ, whereby the latter pushbuttons are restricted to insertion into said upper portion of the recess in only one or another of two rotary positions one hundred and eighty degrees removed from each other.

The bottom wall of the cruciform lower portion of the recess is provided with a relatively shallow circular depression of relatively large diameter, as shown at 35ˢ, Fig. 5, depression 35ˢ being adapted to accommodate the correspondingly large lower end coil of a spirally wound, cone-shaped, compression spring 36 (Figs. 6 and 7). The upper end coil of spring 36 is adapted to accommodate or surround a boss 37ᵃ formed upon the otherwise flat lower end of a contactor-carrying plunger 37 (Figs. 6 and 7); and spring 36 is characterized by adaptability thereof to substantially complete compression thereof, or nesting of the coils thereof within each other in recess 35ˢ, as an incident to depression of said plunger.

The bottom wall of the intermediate portion of said base recess is defined by the four ledges, each designated by the numeral 35ᵗ in Fig. 5, and each ledge extending to the outer surface of base 35, as best shown in Figs. 1 and 2, as an incident to the formation of the four corner openings or windows in base 35 by the molding operation. Extending upwardly from the lower surface of base 35 are molded passages which open onto the respective ledges 35ᵗ, the lower ends of said passages being enlarged or countersunk, as shown at 35ᵘ in Fig. 4, to accommodate the heads of screws 38, the shanks 38ᵃ of which (see Fig. 1) penetrate tapped openings in pairs of left-hand and right-hand combined stationary contact and terminal members, respectively designated by the numerals 39 and 40 in the several figures of the drawings.

As best illustrated in Fig. 11, the members 39 and 40 are composed of identical punched and stamped sheet metal elements having like tapped openings 39ᵃ, 40ᵃ and 39ᵇ, 40ᵇ formed therein. The openings 39ᵃ, 40ᵃ are adapted to receive the aforementioned screw shanks 38ᵃ whereby said members are secured to the respective ledges 35ᵗ (see Figs. 1 and 2); and the openings 39ᵇ and 40ᵇ are adapted to receive (in either direction) the shanks of binding screws 41. The shanks of screws 41 are provided with reduced cylindrical end portions 41ᵃ to facilitate insertion and threading thereof into said tapped openings, as will be obvious.

Members 39 and 40 are respectively provided at the wiring terminal end portions thereof with pairs of lugs bent therefrom in opposite directions to lie in substantially parallel planes, as indicated at 39ᶜ, 39ᵈ and 40ᶜ, 40ᵈ (Fig. 11). By this means one lug of each pair is adapted to cooperate with the head of a screw 41 to afford a wire beard guard, regardless of the direction in which the screw shank is inserted. This not only provides for use of identically formed blanks, but it also provides for either top or bottom wiring, or both, of a switch, depending upon the arrangement of the terminal portions desired or required.

Members 39 and 40 preferably have the corresponding corners of their contact portions cut away, as indicated at 39ᵉ and 40ᵉ in Fig. 11, contact tips or buttons 42 being spot-welded or otherwise rigidly secured to said contact portions in a substantially flush and symmetrical relationship to the edges of said cut away corners, the contact tip 42 being secured to one surface of the blank to provide a left-hand member 39, and the tip 42 being attached to the opposite surface of such a blank to provide a right-hand member 40 (bottom of Fig. 11).

Referring again to Fig. 5, it will be noted that the cruciform lower portion of the base recess has the two vertical grooves 35ᵐ, which are alined with extensions 35ᵃ and 35ᵇ, extending laterally beyond the corresponding side walls 35ⁿ of the intermediate square portion of said recess; whereas the other pair of alined grooves 35ᵐ have relatively narrow lateral groove extensions 35ᵛ, 35ᵛ; all of said vertical grooves opening upwardly to opposed pairs of ledges 35ʷ and 35ˣ, which are located in a common plane slightly below the upper end of the intermediate square portion of the recess; said ledges defining a second substantially rectangular recess whose peripheral walls are displaced at a rotary angle of ninety degrees from the walls of said intermediate recess.

The aforementioned contactor-carrying plunger 37 preferably consists of a single molded insulating piece of the form best illustrated in Fig. 11, said piece preferably being composed of hot molded "Bakelite," or a similar hot molded insulating material. As shown, plunger 37 is of cruciform in transverse cross section at the lower end and throughout the major portion of its length, the same having relatively narrow lateral extensions 37ᵇ, 37ᵇ (Figs. 6 and 7) on its opposite arms 37ᶜ, 37ᶜ to slide within the vertical grooves 35ᵛ, 35ᵛ; the other arms 37ᵈ, 37ᵈ of said plunger being slidable within the pair of vertical grooves 35ᵐ, 35ᵐ alined with extensions 35ᵃ and 35ᵇ aforedescribed. The arrangement is such that plunger 37 may be inserted into the base recess in only one or another of two rotary positions spaced one hundred and eighty degrees from each other.

Plunger 37 has formed integrally therewith at the lower end thereof four relatively thin or plate-like fillets 37e, 37f, 37g and 37h (Figs. 6, 7, 10 and 11), which serve to provide a relatively large flat lower surface (see Figs. 6 and 7) for the plunger, while providing clearance between the same and the vertical walls of the cruciform lower portion of the base recess, said lower surface having formed thereon the centrally located boss 37a for cooperation with the upper end of spring 36, as aforedescribed.

The arms 37c, 37c of plunger 37 are formed intermediate the length thereof with substantially rectangular notches or recesses 37i, 37i (Figs. 6, 7, 8 and 11), each notch being adapted to accommodate the intermediate portions of a pair of like punched and stamped sheet metal contactor-carrying members 43, 43 (see Fig. 11), preferably composed of brass or a similar metal of good electrical conductivity. Each member 43 has a pair of opposite end portions 43a and 43b located in a common plane and an intermediate offset or raised portion 43c located in a plane parallel thereto. The end portions 43a and 43b include integral extensions 43d and 43e in the form of arcs of relatively small circles; and to those surfaces of end portions 43a and 43b adjacent to offset portion 43c are attached, preferably by spot welding, a pair of contact tips 44, 44 of highly conducting and arc-resisting material, such as silver. As shown, the tips 44 are attached in positions to respectively overlie the extensions 43d and 43e in a substantially flush relationship to the outer edges of the latter.

The intermediate portion 43c of each member 43 is provided with a lateral projection 43f of rectangular contour, and of a size to adapt the same for a sliding fit within one or the other of the groove extensions 35v in the base recess; the arrangement being such that when the pairs of members 43 are positioned within notches 37i the aforementioned projections will be located in substantial alinement with the outer surfaces of the lateral extensions or ribs 37b on opposite sides of plunger 37. Members 43 are thus held against substantial displacement in any transverse direction during vertical reciprocation thereof with plunger 37. In practice I prefer to notch each member 43 at the side opposite to, but in alinement with projection 43f, as indicated at 43g, thus enabling punching of said members 43g from a metal strip with a minimum of waste.

Two of the members 43 are assembled in the relationship thereof indicated in Fig. 11; that is, with their offset portions 43c extending away from each other, with a cylindrical coiled compression spring 45 interposed between the inner surfaces thereof. As indicated in Fig. 11 the spring 45 is preferably so wound that the opposite end coils 45a and 45b thereof are located in parallel planes at right angles to the axis of the spring, thus insuring a normal straight-line bias of members 43 away from each other toward the respective lower and upper walls of the notch 37i, the degree of lost motion provided between the pair of members 43 and the upper and lower walls of notch 37i being indicated in Fig. 8. Thus it will be apparent that as the plunger 37 moves away from either its upper or lower extreme position the members 43 of each pair will be spread apart by spring 45 to respectively engage the lower and upper walls of the notch 37i with which they are associated.

As shown in Fig. 11 I prefer to provide the opposite arms 37d of plunger 37 with rectangular notches or recesses 37j, which are relatively deeper than, but of the same vertical dimension as and horizontally alined with, the notches 37i. The primary purpose of notches 37j is to provide passage for bus members between the contactors, when bus members are employed, engagement of the upper and lower portions of the arms 37c and 37d with the walls of the vertical grooves in the base recess being insured in all operative positions of the plunger.

As best illustrated in Fig. 11 plunger 37 has formed integrally therewith a substantially square, plate-like portion 37k, the pairs of rounded corners 37l, 37l and 37m, 37m of which project laterally beyond the arms 37d, 37d and the extensions 37b, 37b of arms 37c, 37c and are designed to act as a barrier to substantially prevent entrance of foreign matter (either liquid or solid) into the switch chamber. As shown in Fig. 11 the corners 37m, 37m are smaller, and therefore farther apart, than the corners 37l, 37l, which is in accordance with the aforestated fact that plunger 37 can be accommodated within the base recess in only two positions spaced by a rotary angle of one hundred and eighty degrees.

Plunger 37 is provided at the upper surface of portion 37k with an integral, centrally located, upward extension 37n of substantially square form in transverse cross section, except that the four corners thereof are slightly curved, as shown at 37o. The square upper end of extension 37n is symmetrical with but of slightly smaller dimensions than the main body thereof, as shown at 37p, the four corners of said end portion adjacent to extension 37n having notches or cut-aways 37q formed therein by the molding operation. As shown in Fig. 6, a split wire ring 46 is adapted to be forced over the upper end portion 37p until it snaps into engagement with the walls of the aforementioned notches 37q. As will be apparent from Figs. 6 and 11 the pairs of parallel flat sides of plunger extension 37n are respectively located in planes parallel to the outer surfaces of the arm extensions 37b, 37b and the outer surfaces of the arms 37d, 37d.

A pushbutton 47 (see Fig. 6) is provided with a centrally located recess 47a which closely but slidably fits over the extension 37n of the plunger, the spring ring cooperating with the walls of said recess to frictionally hold button 47 against upward movement relatively to the plunger. Such connection between said parts nevertheless permits manual removal of the pushbutton from the plunger and re-assembly of the former to the latter in any one of four positions at ninety degree rotary angles from each other. This feature is of advantage where the concave upper surface 47b (Fig. 6) of the pushbutton is provided with an indicating legend which may be required to be in any one of four angular or rotary positions, depending upon the manner of mounting the switch in a panel or casing either alone or along with another switch or switches of like or similar character. The lower end of the recess 47a in said pushbutton is enlarged and provided with angular or beveled walls, as shown at 47c in Fig. 6, to facilitate telescoping thereof onto extension 37n, said lower end of the pushbutton being adapted to abut or seat against the plate-like portion 37k of the plunger.

Offset upwardly from the lower end of pushbutton 47 and formed integrally therewith is an annular flange 47d of substantially uniform width and thickness (Fig. 6); said flange being preferably provided with four symmetrically arranged arcuate notches (two of which are indicated at 47e, 47e in Fig. 7) to provide clearance between said flange and the heads of screws 38 (Fig. 8) which are employed to secure the upper pair or pairs of stationary contact and terminal members to the base.

A flat, punched sheet metal guide plate 48 of the form best illustrated in Fig. 9 is provided with a circular opening 48a to slidably accommodate and guide the pushbutton 47 to assist in restricting the latter to reciprocating movement in a straight line, said plate 48 being provided at opposite sides thereof with lugs 48b and 48c having outwardly opening U-shaped notches 48d and 48e formed therein. Plate 48 is adapted to seat against the upper ends of extensions 35a and 35b, the latter having downwardly offset ledges 35y and 35z to accommodate a part of the thickness of lugs 48b and 48c and the adjacent peripheral portions of said plate.

In assembling the parts thus far described, either one or two pairs of right-hand and left-hand combined stationary contact and terminal members 39 and 40 are secured to the ledges 35t (Fig. 5) by the screws 38 (Fig. 4) to form the lower contacts of the switch. Thereafter the spring 36 is positioned within the depression 35s (Figs. 6 and 7) in the lower end wall of the base recess, whereupon the plunger 37, having one or two pairs of contactors assembled with respect thereto and temporarily held in proper position by the biasing action of the spring or springs 45, is inserted into the base recess, the lower end of said plunger being seated against the upper end of the cone-shaped spring 36, the boss 37a cooperating with said upper end of the spring to assist in centering the same. Plunger 37 is then depressed to a sufficient degree to permit insertion of one pair of right-hand and left-hand combined stationary contact and terminal members 39 and 40, which are then secured in position by an upper pair of securing screws as shown at 38 in Fig. 8. If the switch is to be provided with two pairs of normally closed (or upper) stationary contacts, the plunger is again slightly depressed to provide for manual insertion of another pair of members 39 and 40, which are then likewise secured by a pair of screws 38.

Figure 12:
Fig. 12 is a perspective view of one of two like "dummy" contacts which are preferably employed in a switch which is not provided with any normally closed upper contacts.

It will be apparent to those skilled in the art that a switch constructed in accordance with my invention may be adapted for use of only one pair of upper stationary contacts or only one pair of lower contacts, in which case only one pair of contactors is required. Of course only one of the contactors will then actively perform its contactor functions, but the contactor not active may serve as a spare, to be used when needed by merely removing the plunger and turning the pair of contactors upside down.

Where two pairs of contacts (upper and lower) are arranged on the same side of the switch base only one pair of contactors is required. When a switch is constructed with only one or two pairs of lower (normally open) contacts, but with no upper (normally closed) contacts, I prefer to employ at least one pair of "dummy" upper contacts on at least one side of the switch on which there is a pair of bridging contactors. Such "dummy" contacts may be of the form shown at 49 in Fig. 12, each of the same comprising a substantially square punched sheet metal plate having a centrally located tapped opening 49a to accommodate the shank of one of the aforementioned securing screws 38, and the same being stamped to provide an upwardly offset corner portion 49b (which simulates in its height above the main body thereof the height of a stationary contact tip 42), the portions 49b of the "dummy" contacts being positioned for engagement with the upper bridging contactor of a pair. With such an arrangement excessive outward displacement of the plunger 37, and consequently of the pushbutton 47, is avoided, thus insuring accurate and proper normal positioning of the latter. On the other hand, where no lower contacts are employed in a switch no "dummy" contacts are required, inasmuch as the lower end of the plunger 37 (Fig. 11) will engage the bottom wall of the base recess to positively limit the degree of inward movement of the plunger. It will be apparent from the foregoing that the switch may comprise two pairs of upper contacts and two pairs of lower contacts, with a consequent requirement for two pairs of contactors; whereas the number of pairs of contacts and contactors may of course be varied between the two extremes, depending upon the electrical characteristics desired.

After the desired or required number and location of pairs of contacts and contactors has been effected, the pushbutton 47 is pressed onto the plunger extension 37n (the spring ring 46 having been previously assembled upon the reduced end 37p of said extension) and the plate 48 is positioned upon the upper ends of the extensions 35a and 35b to surround the pushbutton and to overlie the flange 47d on the latter (Figs. 6 and 7).

Thereafter an adapter member 50 of substantially annular form is positioned over plate 48 and is adapted to seat against the latter throughout the annular overlapping portions of said parts (see Figs. 6 and 7). As indicated at 50a and 50b in Fig. 6 the lower end portions of lateral extensions 50c and 50d of member 50 extend downwardly a slightly greater distance than the main body thereof, the downwardly extending portions being formed to closely surround or fit the aforementioned lugs 48b and 48c on plate 48, to assist in preventing relative lateral movement between said parts. Member 50 preferably consists of a zinc base metal die casting, although die castings of other suitable or desired compositions may, of course, be employed.

Member 50 has a relatively large central circular opening 50e formed therein to provide sliding clearance for pushbutton 47, which normally projects only slightly above the annular extension 50f on said member, as shown in Figs. 1, 2, 6 and 7. The annular flat upper surface 50g of member 50 around extension 50f is adapted to rather closely underlie a panel or cover member, shown in dotted lines at 51 in Fig. 6, said panel or cover member having a circular opening 51a to accommodate the extension 50f. The lateral extensions 50c and 50d are vertically alined with the lateral extensions 35a and 35b of base 35, and are provided with vertical passages 50h and 50i, the upper ends of which open to relatively deep countersinks 50j and 50k which are respectively adapted to accommodate the heads 52a, 52a of relatively long bolts or screws 52, 52, whose shanks extend downwardly through passages 50h, 50i, notches 48d, 48e, passages 35c, 35d, and have threaded lower ends 52b, 52b which take into tapped openings in the inner wall of a panel or casing as indicated in dotted lines at 53 in Fig. 6. Lockwashers 54, 54 (Fig. 6) are preferably associated with the heads 52a of the bolts to prevent accidental loosening thereof, and fiber or leather washers 55 (Fig. 6) cooperate with the threaded ends $52^b$ of the bolts to prevent accidental dislocation of the latter prior to base mounting of the switch to a suitable support.

Adapter member 50 is provided with a pair of opposed lateral extensions $50^l$ and $50^m$ the lateral edges of which are flush with peripheral flange portions $50^n$ and $50^o$ (see Fig. 2), said extensions providing material to enable formation of a pair of cylindrical upwardly opening recesses $50^p$ and $50^q$ (Fig. 3), which with countersinks $50^j$ and $50^k$ are selectively adapted to accommodate a lug upon an indicating or legend plate to prevent rotary displacement of the switch. Such an indicating plate is not ordinarily employed, however, in the base mounted type of switch now under consideration. Member 50 is also preferably provided with an annular internal recess $50^r$ (Figs. 6 and 7) which is adapted to accommodate certain additional elements not required for switches of the character disclosed herein; a plurality of relatively small rectangular notches or recesses being formed interiorly of member 50 for communication with recess $50^r$, two of said notches being shown at $50^s$ and $50^t$ in Fig. 7.

The switches herein disclosed are of the so-called heavy duty type, and are of relatively small size with respect to their capacity. An important step in the attainment of this desirable result resides in the use of my novel one-piece molded insulating base, in conjunction with my novel one-piece molded insulating plunger or contactor-carrier. The arrangement is such that the double-break bridging contactors on opposite sides of the plunger are properly insulated to handle up to 600 volt currents. The bridging contactors, as aforedescribed, are used in pairs with a spring between them, whereby contactor follow-up in respect of both the normally open and normally closed (or bridged) stationary contacts is insured. All contactors and stationary contacts are readily removable to provide for replacement of such parts. Adequate clearance is provided between all of the circuits controlled by the switch. The terminal members permit assembly of the binding screws to provide for either top or bottom wiring, or both.

Normally the terminal members extend lengthwise of the greatest transverse dimension of the base, as shown in the device of Figs. 1 to 11, in which case top wiring of the upper terminals and bottom wiring of the lower terminals (which underlie upper terminals) is necessary or desirable. On the other hand, when upper and lower terminals totaling more than four in number are employed, certain of the upper and/or lower terminals may be assembled to extend at a right angle from the respective positions thereof shown in Figs. 1 to 11, whereby overlying of the lower terminals by any of the upper terminals is avoided.

Figure 13:
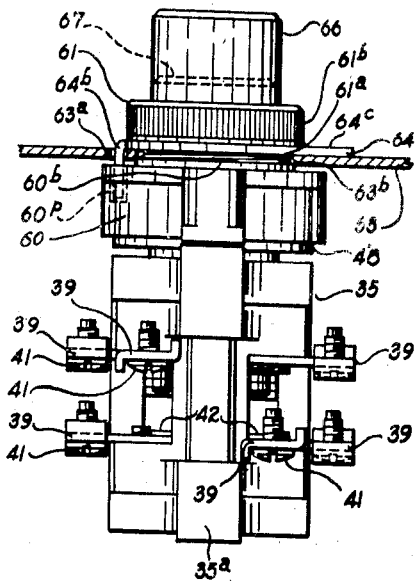
Fig. 13 is a side elevational view similar to Fig. 2, showing substitute parts to provide for one-hole mounting of the switch, with all of the terminals arranged for bottom wiring, a long pushbutton being shown in full lines, and an alternative shorter pushbutton being indicated by dotted lines.
Figure 14:
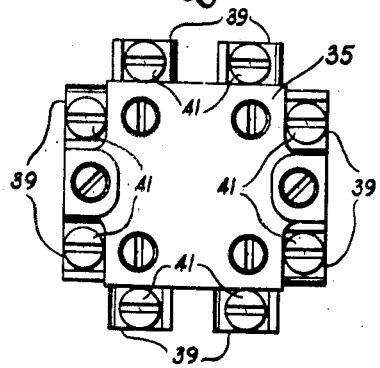
Fig. 14 is a bottom plan view of the switch shown in Fig. 13.
Figure 15:
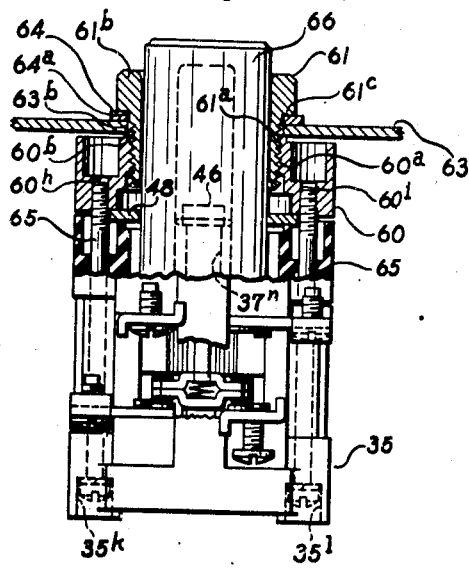
Fig. 15 is a side elevational view, at a right angle to that of Fig. 13, with the adapter parts and a portion of the insulating base shown in vertical section, and with another portion of the base broken away to show the contactors engaged with the lower contacts as an incident to depression of the pushbutton.

A switch with an arrangement of the terminals such as that just mentioned is shown in Figs. 13 to 15, wherein the screws 41 are shown assembled in a manner to provide for bottom wiring of all of the terminals. As will be understood, of course, all or any number of the binding screws might be assembled to provide for top wiring, if desired.

The manner in which the elements disclosed in Figs. 1 to 12, inclusive, may be variously combined to provide switches having a large number of different circuit controlling characteristics will be apparent to those skilled in the art, in the light of the foregoing description. To greatly increase the possible number of different combinations of circuit controlling elements I have provided a number of different groups or pairs of stationary contacts, the contacts of each pair having a bussing connection or conductor interposed therebetween, as shown in Figs. 26, 27 and 28; and as shown in Fig. 29 a bussing connection may be provided between each transversely alined pair of bridging contactors actively employed in a given switch.

Referring more particularly to Fig. 26, the numerals 56, 56 designate a pair of like punched sheet metal contact plates, composed of brass, for instance. Plates 56 are of substantially square form with rounded or arcuate corners, as illustrated. Said plates are provided with centrally located tapped openings $56^a$ to accommodate the shanks of the securing screws 38 aforementioned. Each plate has spot-welded or otherwise rigidly attached to one corner thereof a contact tip 42 of the character aforedescribed. A bus member or connector 57, preferably consisting of a suitable length of multiple-strand flexible copper wire, has its opposite ends rigidly attached, as by spot-welding, to corners of the adjacent sides of members 56 in the manner illustrated at $57^a$ and $57^b$ in Fig. 26. The members 56 may be substituted, for example, for the upper combined contact and terminal members 39 and 40 in Fig. 2, the wire 57 being flexed or bent around the intermediate portion $35^{aa}$ of lateral extension $35^a$, said portion $35^{aa}$ being slightly offset inwardly to substantially correspond to the wire thickness. The four upper contacts and the two upper bridging contactors in Fig. 2 would then provide a four-break control for a single circuit. Similarly, or alternatively, a set of bussed contacts 56 might be substituted for a transversely alined set of lower contact and terminal members 40 and 39 in the switch of Fig. 2, with an obvious result.

In Fig. 27 I have shown a plate 56 having the aforementioned bus connection 57 with a combined contact and terminal member 40, as indicated at $57^a$ and $57^b$. With the assembly of Fig. 27 substituted for either a pair of the upper contacts or the lower contacts shown in Fig. 2, it will be apparent that with a circuit wire connected to member 40 (Fig. 27) by a binding screw 41 as aforedescribed, the bridging contactors when engaged with such stationary contacts will effect closure of a pair of circuits branching from the common terminal represented by numeral 40 in Fig. 27.

In the modification shown in Fig. 28 a relatively greater length of bus wire is employed; the end $58^a$ of which is attached to member 40 in the same manner as in Fig. 27, whereas member 56 is reversed with respect to the position thereof shown in Fig. 27, and the end $58^b$ of wire 58 is spot-welded to a diametrically opposite corner of said member 56, as shown in dotted lines at $58^b$, but upon the same surface as the contact tip shown in dotted lines at 42. As an example, the assembly of Fig. 28 might be substituted for the lower left-hand and the upper right-hand contact and terminal members 40 shown in Fig. 2. As a result, a circuit would be completed including the lower left-hand terminal member (see Fig. 2) in each extreme position of the bridging contactors.

In Fig. 29 I have shown a transversely alined pair of bridging contactors 43 permanently electrically connected by a suitable length 59 of multiple-strand flexible copper wire of the character aforementioned, the opposite ends of said wire being spot-welded to the respective contactors 43 adjacent to two of the alined tips 44, 44, as indicated at 59ᵃ and 59ᵇ. The arrangement is such that bus member 59 will be nowise interfere with the normal movements of the contactors when in use. While I have shown but one transversely alined pair of contactors in Fig. 29, it is to be understood that in practice both transversely alined pairs of such contactors may be so electrically connected by wires 59. Also, preferably, the two assemblies like that shown in Fig. 29 are so arranged, in reverse relationship, that one wire 59 will overlie the other, to facilitate assembly of the four contactors and their associated springs 45 with respect to plunger 37. When the contactors are so electrically connected, it is obvious that all of the upper stationary contacts will be electrically connected in the normal position of the pushbutton, whereas all of the lower stationary contacts will be electrically connected when the pushbutton is fully depressed. The utility of such an arrangement will be apparent to those skilled in the art.

Various combinations of the assemblies shown in Figs. 26 to 29, inclusive, with the elements described in connection with Figs. 1 to 12 may, of course, be provided in an obvious manner; and illustration or further description of such modifications is believed to be unnecessary.

Referring again to Figs. 13 to 15, inclusive, it is to be understood that most of the parts are identical with those illustrated in Figs. 1 to 11, and such parts have, of course, been given like numerals of reference. It is to be noted, however, that where the space limitations are satisfied by (or permit) an arrangement of the terminals like that shown in Figs. 13 to 15, it is possible to use all left-hand or all right-hand combined contact and terminal members. With reference to Fig. 1, it will be noted that I there used a combined contact and terminal member 39 at the lower left-hand side of said figure, although such a member 39 was also used at the upper right-hand side in said figure. To avoid confusion, the member 39 is therefore considered herein to be of the left-hand type, wherever used.

By comparison it will be noted that the upper left-hand and lower right-hand members 39 in Fig. 2 are structurally identical with members 39 correspondingly positioned in Fig. 13. However, inasmuch as the wiring terminal portions of the members are, in Fig. 13, permitted to extend laterally at a right angle to the longer side of base 35 it is obvious that I may use members of the same structural form for this purpose, as shown at 39, 39 at the lower left-hand and upper right-hand points in Fig. 13. The same is therefore of necessity true as to all of the combined contact and terminal members employed, eight of the members 39 being shown employed in the switch of Figs. 13 to 15. As shown in said figures, such arrangement of the terminal portions permits an arrangement of all of the binding screws 41 to provide for bottom wiring (as best illustrated in Fig. 14), or, alternatively, all of the screws 41 may be arranged for top wiring.

With reference to the lower member 40 at the left-hand side of Fig. 2 and to the upper member 40 at the right-hand side in said figure, it will be obvious that a member 40 might be used at the upper left-hand side of Fig. 2, if the terminal portion thereof were extended outwardly at a right angle to the wider side of base 35; and a member 40 could likewise be employed at the lower right-hand side of said figure if extended laterally at a right angle to the opposite wider side of base 35. It follows that eight combined contact and terminal members of either the form designated by numeral 39 or the form designated by numeral 40 may be employed where all of the terminals are to be adapted for either bottom or top wiring.

The switch of Figs. 13 to 15 is of the pushbutton type and is adapted for one-hole mounting. For this purpose an adapter 60 is provided. Adapter 60 is exteriorly the same as adapter 50 aforedescribed, and accordingly one part of the casting die may be employed in forming both adaptors 50 and 60. However, different core portions are required for forming the respective adapters. Thus adapter 60 is provided with a central circular opening which is of substantially larger diameter than the opening 50ᵉ in adapter 50. Said opening in adapter 60 is tapped, as shown at 60ᵃ in Fig. 15, to cooperatively receive the externally threaded lower end portion 61ᵃ of a hollow bushing 61, the enlarged upper end 61ᵇ of which is vertically milled peripherally throughout the major portion of its height to facilitate rotation thereof, either manually or otherwise, into clamping position; said enlarged end having a horizontal shoulder 61ᶜ (Fig. 15) to act as a clamping surface.

Interposed between said shoulder 61ᶜ and the upper surface of a panel or cover member 63, here shown as composed of metal, is a punched and stamped sheet metal indicating plate 64. Plate 64 is provided with a circular opening 64ᵃ (Fig. 15) to accommodate portion 61ᵃ of bushing 61, and said plate is provided with an integral lug bent downwardly at a right angle thereto, as shown at 64ᵇ in Fig. 13, to fit into a recess of substantially corresponding size, as shown in dotted lines at 60ᵖ in said figure, whereby plate 64 is restrained against relative rotary displacement. As shown in Fig. 13, member 63 is provided with an opening 63ᵃ to provide clearance for lug 64ᵇ, and member 63 is also provided with an opening 63ᵇ to afford clearance for the lower end portion 61ᵃ of bushing 61. The horizontal surface portion 60ᵇ of adapter 60 is adapted to underlie a portion of member 63 around the opening 63ᵇ in the latter, whereby adapter 60 is clamped to member 63. Adapter 60 is likewise provided with a pair of tapped openings 60ʰ and 60ⁱ, which are of relatively smaller diameter than the aforedescribed untapped openings 50ʰ and 50ⁱ of adapter 50 (see Fig. 6). Said tapped openings 60ʰ and 60ⁱ are respectively adapted to receive the threaded upper ends of a pair of screws or bolts 65, 65, the heads of which are located in the countersinks 35ᵏ and 35ˡ in the lower surface of base 35. The top surface of the portion 64ᶜ of member 64 (Fig. 13) may have any suitable or desired legend imprinted, embossed, engraved or otherwise applied thereto, to correspond with the electrical characteristics or functions of the particular switch.

The pushbutton 66 (Figs. 13 and 15) is substantially longer than the pushbutton 47 of Figs. 1 to 11. Pushbutton 66 requires the additional length not only because of the added length of the assembly occasioned by the use of bushing 61, but also because of the fact that it is desired to have a greater length of the upper end of pushbutton 66 exposed in the normal position of the latter, as best illustrated in Fig. 13. If desired, a relatively shorter pushbutton may be employed in the device of Figs. 13 to 15, as indicated in dotted lines at 67 in Fig. 13. The pushbutton 67 is also substantially longer than the pushbutton 47. Except for the differences in length, the pushbuttons 66 and 67 may be the same as the pushbutton 47 heretofore described. It follows that all of the pushbuttons 47, 66 and 67 may be formed in molding dies having certain parts thereof identical, different core members only being required to produce the relatively longer plunger-end-receiving recesses in pushbuttons 66 and 67. Except for the different arrangement of terminals heretofore described in connection with Figs. 13 to 15, it is obvious that the elements of such switch not mentioned may be identical with the corresponding elements of the switch of Figs. 1 to 11, inclusive. Further description of the switch of Figs. 13 to 15 is therefore believed to be unnecessary.

Figure 16:
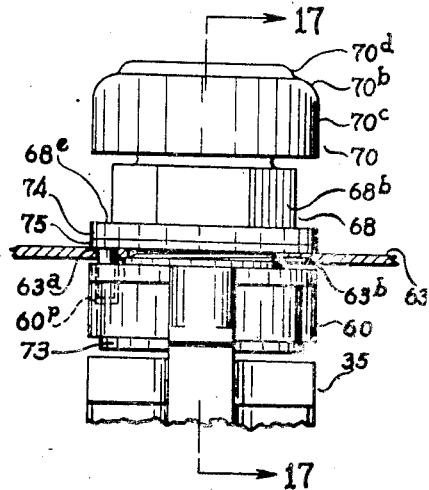
Fig. 16 is a side elevational view similar to Fig. 13, but showing a mushroom head type of operator in combination with a one-hole mounting type of switch, a fragment only of the insulating base being shown.
Figure 17:
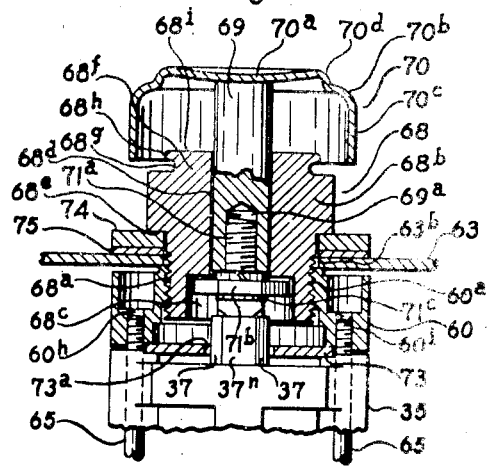
Fig. 17 is a vertical sectional view, on the line 17—17 of Fig. 16, the upper end portion of the base, the plunger, and portions of the operator being shown in elevation.

In the modification illustrated in Figs. 16 and 17 it is to be understood that the insulating base 35 may have any desired arrangement of the aforedescribed stationary contact and terminal members and bridging contactors. This switch is of the one-hole mounting type having a mushroom-head type of operator. Accordingly I prefer to employ an adapter member 60, identical with the adapter of Figs. 13 to 15. A metal bushing 68 has an externally threaded lower end portion 68ᵃ which penetrates the panel opening 63ᵇ and takes into the tapped opening 60ᵃ in adapter 60. Bushing 68 is provided with an enlarged upper end portion 68ᵇ preferably of hexagonal form in transverse cross section, as best illustrated in Fig. 16. Bushing 68 is provided at its lower end with a relatively large, centrally located, downwardly opening recess or countersink 68ᶜ (Fig. 17); and a passage 68ᵈ, of relatively smaller diameter than but alined with said recess, extends to the upper end of said bushing.

The mushroom-head operator includes a cylindrical shank member 69 which is adapted for a free but relatively close sliding fit within the bushing passage 68ᵈ. A stamped sheet metal head 70 of circular contour has its concave or dished upper surface portion alined with and rigidly attached to the upper end of shank member 69, as by spot-welding, as indicated at 70ᵃ. Head 70 has an annular downwardly curved portion 70ᵈ, an outwardly curved portion 70ᵇ adjacent thereto, and a vertically downwardly extending skirt portion 70ᶜ, which is of a diameter to clear the enlarged portion 68ᵇ of bushing 68.

The shank portion 69 is provided at its lower end with a drilled and tapped recess 69ᵃ to receive the shank 71ᵃ of a specially formed bolt, the hexagonal head of which is designated by numeral 71ᵇ (Fig. 17). A split lock-washer 72, of smaller diameter than shank member 69, is preferably interposed between the lower end of the latter and the bolt head 71ᵇ, to restrain said bolt against accidental loosening. Bolt head 71ᵇ underlies the end wall of recess 68ᶜ to prevent accidental manual removal of shank member 69 from bushing 68, whereas, as shown in Fig. 17 said bolt head 71ᵇ is normally spaced downwardly to a slight degree from said end wall of recess 68ᶜ. Formed integrally with and located centrally upon the lower surface of bolt head 71ᵇ is a relatively short, cylindrical, downward extension 71ᶜ (Fig. 17) which is adapted to abut against the flat, square upper surface of the portion 37ᵖ of plunger extension 37ⁿ.

A flat, punched sheet metal plate 73, having a thickness and peripheral contour identical with those of plate 48 aforedescribed, is provided with a central circular opening 73ᵃ of a diameter to accommodate the plunger extension 37ⁿ and the downward extension 71ᶜ of bolt head 71ᵇ (Fig. 17), but smaller than the peripheral contour of said bolt head; wherefore the lower surface of the latter is adapted to abut against the upper surface of plate 73, upon depression of the mushroom-head, to positively limit the degree of inward movement of extension 71ᶜ against the plunger. In this manner any possible injury to the contacts and contactors, or to the plunger 37 carrying the latter, is insured against, in the event of excessive pressure being applied to the mushroom-head operator. The insulating base 35 with its associated parts is rigidly attached to adapter member 60 as by means of the pair of bolts 65, in the manner described in connection with Figs. 13 to 15.

The horizontal annular shoulder 68ᵉ formed between portions 68ᵇ and 68ᵃ of bushing 68 is adapted to seat against the upper surface of a panel of a suitable thickness to insure the proper distance of the end wall of recess 68ᶜ from the extension 37ᵖ of plunger 37 in the normal position of the latter, but where a relatively thin panel 63 (Fig. 17) is employed I prefer to interpose between said shoulder 68ᵉ and the upper surface of the panel a washer or washers of suitable height or thickness, as shown at 74 and 75. By this means proper normal (or upper extreme) positioning of plunger 37, under the bias of spring 36 aforedescribed, may be insured.

Figure 18:
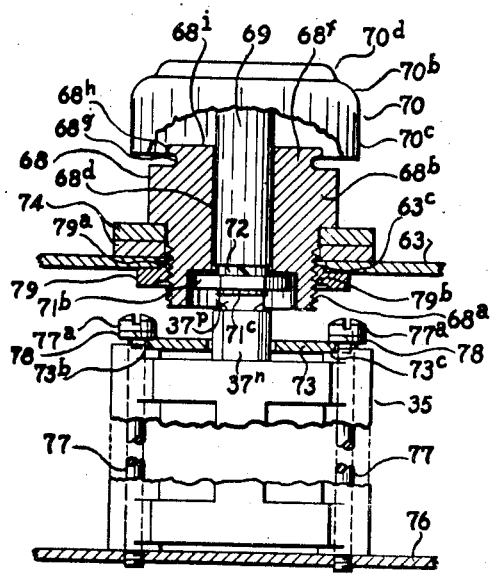
Fig. 18 is a side elevational view somewhat like Fig. 1, but showing a mushroom head type of operator in combination with a base mounted type of switch, portions of the operator and the one-hole mounting means therefor being shown in vertical section, and only upper and lower fragments of the insulating base being illustrated.

The switch shown in Fig. 18 includes most of the parts of the switch shown in Figs. 16 and 17, and such parts have been given corresponding numerals of reference. In Fig. 18, however, the base 35 is adapted to be attached to a rear panel or casing wall 76 as by means of a pair of bolts 77, 77 of suitable length; the heads 77ᵃ of said bolts being adapted to overlie the opposite notched ends or extensions 73ᵇ and 73ᶜ of plate 73 to provide for clamping of base 35 in position. A pair of lock-washers 78, 78 preferably underlie the heads of bolts 77 to prevent accidental loosening thereof.

The front panel or cover member 63 in Fig. 18 is adapted to be spaced at such a distance from the rear panel 76 that the extension 71ᶜ of bolt head 71ᵇ may rest against the end portion 37ᵖ of plunger 37 without affecting the outward (or upward) bias upon the latter afforded by the aforementioned spring 36. As will be noted, the mushroom-head operating elements in Fig. 18 are supported by panel 63 substantially in the manner disclosed in Figs. 16 and 17, whereas the insulating base 35 with its associated parts is attached to panel 76, as aforedescribed. I therefore provide in the panel 63 in Fig. 18 a circular opening 63ᶜ which is of relatively larger diameter than the substantially corresponding opening 63ᵇ (Fig. 17). Said opening 63ᶜ is adapted to provide rotating clearance for the upwardly extending annular flange 79ᵃ of a bushing or washer 79, which is preferably of square or other polygonal contour to provide for engagement thereof by a wrench or similar tool, washer 79 being internally threaded, as indicated at 79ᵇ, for cooperation with the reduced and threaded portion 68ᵃ of bushing 68.

In order to properly locate bushing 68 vertically with respect to the plunger 37 of the switch in Fig. 18, I prefer to employ a pair of washers 74, only one washer of that thickness being employed in the switch of Figs. 16 and 17.

Referring more specifically to the mushroom-head operator shown in each of Figs. 16 to 18, it will be noted that bushing 68 is provided at its upper end with an integral extension 68$^f$ (Figs. 17 and 18) of reduced diameter, said extension being defined by a neck portion 68$^g$ of concave form in vertical cross section and an adjacent overhanging end portion 68$^h$ of convex form in vertical cross section. Also, as best illustrated in Figs. 17 and 18, the skirt portion 70$^c$ of the mushroom-head 70 is adapted to overlap the flat upper end surface 68$^i$ of bushing 68 to some extent, even in the outer extreme position of said mushroom-head. Hence these parts cooperate to prevent direct access of thrown globules of oil or grease to the shank 69; whereas the relatively close sliding fit of shank 69 within passage 68$^d$ in bushing 68 further assists in preventing access of oil or other foreign matter to the contacts and contactors carried by base 35. This arrangement is especially effective when, as usual, the switch is mounted with the height of the base 35 extending in a horizontal plane.

In Fig. 19 I have shown a modification of (or a modified form of) the plunger 37, such modification consisting in drilling or otherwise forming a passage or recess which extends upwardly from the bottom surface of the plunger through one of the arms 37$^c$, as shown in dotted lines at 37$^r$, 37$^r$ in said figure. The passage or recess 37$^r$ is located substantially centrally of the lower and upper walls of one of the notches or recesses 37$^l$, exclusive of those portions of the notch walls formed by the lateral extension 37$^b$ of the arm 37$^c$. As shown in Fig. 19, a coiled compression spring 80 is positioned within the recess 37$^l$ in overlying relationship to a flat, punched sheet metal contactor 81, said contactor having a centrally located opening, shown in dotted lines at 81$^a$, and a pin 82 is inserted upwardly through the lower portion of passage 37$^r$, and through said contactor opening 81$^a$ and spring 80 into the upper portion of said passage. Prior to insertion of pin 82 the lower end portion is bent or curved slightly, as shown in dotted lines at 82$^a$, wherefore a drive- or force-fit thereof into passage 37$^r$ is required to bring the lower end of said pin into a substantially flush relationship to the lower surface of plunger 37.

Contactor 81 as shown is normally adapted to seat against the lower wall of the notch or recess 37$^l$, the ends having contact tips 44 of the character aforedescribed spot-welded or otherwise rigidly attached to the lower surface thereof, as shown. Inasmuch as contactor 81 is held by pin 82 against substantial lateral displacement in any direction, it is obvious that said contactor may be formed from a metal strip of a corresponding width, the lugs 43$^f$ and notches 43$^g$ of contactors 43 being unnecessary in respect of contactor 81.

The plunger 37 may carry, on the side thereof opposite to contactor 81, a pair of the aforementioned contactors 43 having the aforementioned biasing spring 45 interposed therebetween. With the arrangement illustrated in Fig. 19, it is obvious that upon depression of plunger 37 the tips 44 of contactor 81 will first engage their cooperating stationary contacts, and thereafter the tips 44 of the lower contactor 43, on the opposite side of the plunger, will engage their associated stationary contacts. Similarly, upon subsequent upward movement of plunger 37 the tips of said lower contactor 43 will disengage their contacts and thereafter the tips of contactor 81 will disengage their contacts. The upper contactor 43 of the aforementioned pair will cooperate with its associated contacts (as shown) to limit the degree of upward movement of plunger 37. Obviously if desired the contactor 81 in Fig. 19 might be assembled with respect to the notch 37$^l$ in plunger 37 with its contact tips 44 facing upward for cooperation with a pair of stationary contacts, the spring 80 in such an assembly being positioned below said contactor, with the result that contactor 81 would engage its cooperating contacts prior to engagement of the upper contactor 43 of the aforementioned pair with its contacts upon upward movement of the plunger, and said upper contactor 43 would disengage its contacts prior to disengagement of contactor 81 from its contacts upon downward movement of said plunger.

Although I prefer the arrangement illustrated in Fig. 19 for attainment of the results therein contemplated, attention is invited to the fact that (as best illustrated in Figs. 6 and 7) plunger 37 is provided in one of its arms 37$^b$ with a pair of relatively narrow, substantially rectangular slots or recesses 37$^s$ and 37$^t$, the opposed walls of which are jointly adapted to freely receive therebetween a relatively shorter pin (not shown) having assembled thereon a contactor 81 and spring 80 like those shown in Fig. 19, in either of the aforementioned relationships to each other and to plunger 37. The arrangement just described has the primary advantage of providing for ready removal and/or replacement of the pin and the contactor and spring associated therewith, whereas the same will perform those functions described in connection with Fig. 19.

In Figs. 20 and 21 I have shown a switch which may be like that shown in Figs. 1 to 11, except that a flush plate 83 has been substituted for the adapter member 50 of Figs. 1 to 11, and screws 65, 65 (like those of Figs. 15 and 17) are utilized to secure switch base 35 and its associated parts, including pushbutton 47, to plate 83, instead of using the base-mounting screws 52, 52 of Figs. 1 to 11. The plate 48 of Figs. 1 to 11 is employed in the device of Figs. 20 and 21 to positively limit the degree of outward movement of pushbutton 47, although, as aforedescribed, pushbutton 47 will normally be frictionally held to the plunger by the aforedescribed spring ring 46, whereas the movable contactor or contactors will cooperate with the upper stationary contacts to limit the degree of outward movement of said plunger.

Plate 83 is provided with a pair of tapped recesses 83$^a$ and 83$^b$ to receive the shanks of screws 65, the same having a circular opening 83$^c$ formed therein to provide sliding clearance for and to assist in guiding pushbutton 47. Plate 83 is preferably a metal die casting, and the same may embody upon its outer surface a suitable design, as best illustrated in Fig. 20. Plate 83 (Fig. 20) may be provided with a pair of openings 83$^d$ and 83$^e$ to provide clearance for the shanks of bolts or screws (not shown) to attach the plate to the open end of a suitable box or casing.

The mushroom-head operated switch shown in Fig. 22 is adapted for mounting upon panels up to two inches in thickness, and most of the parts thereof may be identical with the corresponding parts of the switch shown in Figs. 16 and 17, which parts have been given like numerals of reference. Thus the mushroom-head 70, shank 69, lockwasher 72, adapter member 60, plate 73, and the base 35 with its associated parts, including plunger 37 are the same in both devices. However, in Fig. 22 I have shown a bushing 84 which is similar to the bushing 68 aforedescribed, except that bushing 84 is provided with a relatively longer reduced lower end portion 84a, which is externally threaded throughout the major portion of its length for cooperation with the internally threaded portion 60a of member 60.

Bushing 84 is provided with a correspondingly longer downwardly opening cylindrical recess 84c which is adapted to accommodate and to provide rotating clearance for the special bolt whose relatively long head of hexagonal form in transverse cross section is designated by numeral 85b, and whose shank, shown in dotted lines at 85a, threads into the tapped recess in the lower end of shank member 69. Said bolt head 85b has formed integrally therewith a cylindrical downward extension 85c corresponding in dimensions with the extension 71c of Fig. 17.

The panel 86 in Fig. 22 is shown as composed of suitable insulating material, the same having a circular opening 86a to accommodate the lower end portion 84a of bushing 84. Panel 86 is provided in its lower face with a relatively large circular countersink or recess 86b which is adapted to freely receive a portion of the length of adapter member 60. Recess 86b is, of course, concentric with passage 86a; and said recess 86b is provided at diametrically opposite predetermined points with a pair of drilled recesses 86c and 86d, which are respectively adapted to accommodate the relatively long threaded shank portions of a pair of screws 87, 87 which penetrate the tapped openings 60h and 60i in member 60 to provide for attachment of base 35 to the latter, as aforedescribed. The shanks of screws 87, 87 thus insure proper rotary or angular positioning of member 60 and base 35 when assembled with respect to panel 86, and similarly insure against accidental angular displacement of said parts after such final assembly. An annular metal washer 87x is preferably interposed between the shoulder 84e formed between the enlarged portion 84b of hexagonal form in transverse cross section and the reduced portion 84a to reinforce the outer surface of panel 86 and to avoid marring or scraping thereof as an incident to tightening of bushing 84.

In Fig. 23 I have illustrated a pushbutton switch adapted for one-hole mounting upon panels up to two inches in thickness. The panel 86, as shown, is identical with that shown in Fig. 22, the same having a circular passage 86a, a downwardly opening countersink 86b concentric with said passage, and a diametrically opposed pair of recesses 86c and 86d. The adapter member 60 and base 35 are identical with the corresponding parts shown in Fig. 22 and in other figures of the drawings, and screws 87 (like those of Fig. 22) are employed to secure base 35 to adapter 60; the upper ends of said screws projecting into the respective recesses 86c and 86d to restrain adapter 60 and base 35 against rotary displacement relatively to panel 86.

A sheet metal plate 73, like that shown at 48 in Figs. 13 and 15, for instance, is interposed between adapter 60 and base 35 in the manner aforedescribed and for the purpose heretofore explained. A relatively long pushbutton 66, like that shown in full lines in Fig. 13, and in Fig. 15, is employed. A hollow metal bushing 88, generally similar to that shown at 61 in Figs. 13 and 15 (in respect of its peripherally milled upper end portion 88b) but having a relatively long hollow end portion of reduced diameter whose major portion is externally threaded upwardly from the lower end thereof as indicated at 88a. Said threaded end portion 88a is adapted for cooperation with the internally threaded portion 60a of adapter 60. A punched and stamped sheet metal indicating plate 64 like that shown in Figs. 13 and 15 may be interposed between the downwardly facing shoulder 88c formed on bushing 88 and the outer surface of panel 86. The base 35 in Fig. 23 may, of course, have any desired arrangement of the aforedescribed contacts and contactors associated therewith. It is to be understood that the pushbutton 66 in Fig. 23 is in its normal upper extreme position.

In Fig. 24 I have shown the manner in which a pushbutton switch of the character herein contemplated may be attached to a panel, such as 89, which may be two inches or more in thickness. For this purpose panel 89 is preferably provided with an upwardly opening cylindrical recess 89a of a diameter to accommodate the externally threaded lower end 61a of bushing 61 (see Figs. 13 and 15), and of a depth to provide adequate clearance for a pushbutton 67 (which is of a length corresponding to that shown in dotted lines in Fig. 13) and for certain elements associated with said pushbutton, as hereinafter described. It is to be understood, however, that a shorter pushbutton, such as that shown at 47 in Figs. 1 to 11, may be employed if desired.

Bushing 61 has threaded engagement with a tapped opening 90a in a sheet metal plate 90. Panel 89 has formed in the upper surface thereof a pair of cylindrical recesses each of which is adapted to receive with a press fit an insert 91, inserts 91 having tapped recesses formed in the upper ends thereof to receive the shanks of a pair of screws 92 which penetrate clearance openings 90b and 90c formed in plate 90, whereby said plate and bushing are secured to the panel. A washer 93 is preferably interposed between the head 61b of bushing 61 and plate 90. Panel 89 is provided in its lower surface with a cylindrical recess 89b which is concentric with recess 89a, and communicates with the latter as by means of a concentric passage 89c of relatively small diameter. Passage 89c is adapted to provide sliding clearance for and to guide a rod 94 of suitable length. The upper end portion of rod 94 is threaded as shown to receive thereon a pair of nuts 95, the lower nut acting to lock the upper nut when the latter has been positioned at the desired point on rod 94. Freely insertable over the upper end of rod 94, and adapted to seat upon the upper nut 95, is a washer 96 which underlies the lower end of pushbutton 67 to provide an abutment or support for the latter.

The lower end of rod 94 is alined with and adapted to engage the upper end 37p of plunger extension 37n, so that upon depression of pushbutton 67 the rod 94 will act upon the plunger 37 to depress the latter. The depth of the recess 89a may be such that the lower nut 95 will engage the lower wall of the same to limit the degree of depression of the pushbutton, or a washer or washers (not shown) may be strung upon rod 94 between said lower nut 95 and said lower wall, for such purpose. Alternatively the rod 94 may have a nut or other enlargement attached at a suitable point above its lower end for cooperation with plate 73 to positively limit the degree of inward movement of said rod.

As shown, panel 89 is also preferably provided in its lower surface with a pair of cylindrical recesses having inserts 91 inserted with a drive fit thereinto, the screws or bolts 65 having their threaded upper ends taking into the tapped recesses in members 91 to secure base 35 and its associated parts against the inner surface of said panel.

In Fig. 25 I have illustrated the manner of and means for attaching a switch having a mushroom-head type of operator to a panel, such as 89, of two inches or more in thickness. In this case panel 89 is provided with an upwardly opening cylindrical recess 89$^d$, which may be of the same diameter as but of less depth than the recess 89$^a$ in Fig. 24. Bushing 68 has its reduced lower end 68$^a$ threaded into the opening 90$^a$ in plate 90, a washer 97 of suitable thickness being interposed between the bushing shoulder 68$^c$ and the upper surface of plate 90. A rod 98 has threaded onto its upper end 98$^a$ a nut 99 of square or other polygonal contour, a lockwasher 72 being positioned upon the upper surface of said nut to bear against the lower end of shank member 69 when said end 98$^a$ of rod 98 is threaded to the desired degree into the tapped recess 69$^a$ in shank member 69, said washer 72 being adapted to function to restrain nut 99 against accidental loosening after the same has been tightened.

Rod 98 is then inserted downwardly through passage 89$^e$, which provides a sliding fit therefor. Thereupon the plate 90 is rigidly attached to panel 89 by means of the pair of screws 92. The threaded lower end 98$^b$ of rod 98 extends beyond passage 89$^e$ into a downwardly opening cylindrical recess 89$^f$ which provides rotary and sliding clearance for a pair of nuts 99, which act to lock each other in position, with the lower nut positioned slightly above the lower end 98$^c$ of rod 98. Said lower nut 99 will then be adapted to cooperate with plate 73 to positively limit downward movement of rod 98, and to thereby also limit the degree of downward movement of plunger 37, so that an excessive pressure cannot possibly be transmitted to the switch contactors.

Panel 89 is provided in its lower face with inserts 91, 91, as described in connection with Fig. 24, to receive the shanks of screws 65, 65 whereby base 35 is attached in proper position to said lower face of the panel.

Fig. 30 illustrates a further modification wherein a switch base 35 is attached to a lower panel, or the bottom wall of a switch box (not shown) as by means of a pair of screws such as those heretofore designated by numeral 65 (see Fig. 15). Base 35 has associated therewith a pushbutton 47 (see Fig. 1). The upper panel or switch box cover 100 is located at a predetermined proper distance from the aforementioned lower panel, said panel 100 having a relatively large circular opening 100$^a$ formed therein, and a pair of relatively small openings 100$^b$ and 100$^c$. A ring 101 of molded "Bakelite" or similar insulating material has a passage 101$^a$ of circular cross section to accommodate and to guide pushbutton 47 during reciprocation of the latter, an annular, integral upward extension 101$^b$, of said ring fitting snugly within opening 100$^a$ and in a relationship substantially flush with the outer surface of panel 100. Ring 101 has openings 101$^c$ and 101$^d$ formed therein in alinement with the respective panel openings 100$^b$ and 100$^c$. A pair of headed rivets 102 have their shanks inserted downwardly through the respective pairs of alined openings, said shanks being upset as shown at 102$^a$ to rigidly and permanently secure ring 101 to panel 100. As will be understood, pushbutton 47 will normally be frictionally held for movement jointly with the aforedescribed switch plunger 37, whereas said pushbutton 47 is positively restrained (by reason of its flange 47$^d$, see Figs. 6 and 7) against substantial upward displacement with respect to, or removal from, ring 101, as will be obvious.

Although I have illustrated and described herein a large number of different combinations of the various elements, it will be apparent to those skilled in this art that almost innumerable other combinations of such elements, either with or without obvious slight modifications, may be effected without departing from the spirit of my invention or the scope of the appended claims. By way of example, attention is called to the fact that by merely slightly enlarging the pushbutton opening 83$^c$ of flush plate 83 in Fig. 21, and then tapping said enlarged opening, the same will be adapted to accommodate the bushing 68 and other elements associated with the mushroom-head operator shown in Fig. 17. With such a change, the plate 73 of Fig. 17 would preferably be substituted for the pushbutton guide plate 48 shown in Fig. 21.

With particular reference to Figs. 2 and 11, it is to be noted that the screws 41 and the openings 39$^b$ and 40$^b$ are provided with right-hand threads, so that after insertion of a wire end between the screw shank and the active lug adjacent to the screw head) and tightening of the binding screw, any outward pull upon the attached wire will necessarily cause a further tightening of the screw. The importance of this feature is believed to be obvious.

I claim:

1. In an electric switch, the combination with a molded contact-carrying insulating base of one-piece construction having a central recess open at one end and also having side recesses for accommodation of two pairs of contacts on each side of a plane coincident with the longitudinal axis of said central recess, said side recesses permitting the contacts to be inserted from outside the base and to be projected into said central recess and each side recess providing for a plurality of contacts opposed seats spaced one from another longitudinally of said base, of a molded contactor-carrying insulating plunger of one-piece construction fitting into the central recess of said base for reciprocation therein and prevention of relative rotation, said plunger having seats for contactors to cooperate with all of said base contacts, and the central recess of said base having clearance for said plunger contactors to permit said plunger together with its contactors to be freely inserted into said base and to be reciprocated in the latter.

2. In an electric switch, the combination with a molded contact-carrying insulating base of one-piece construction having a central recess open at one end and also having side recesses for accommodation of two pairs of contacts on each side of a plane coincident with the longitudinal axis of said central recess, said side recesses permitting the contacts to be inserted from outside the base and to be projected into said central recess and each side recess providing for a plurality of contacts opposed seats spaced one from another longitudinally of said base, and each seat permitting the contact carried thereby to be seated therein in either of two positions at right angles one to another, of a molded contactor-carrying insulating plunger of one-piece construction fitting into the central recess of said base for reciprocation therein and prevention of relative rotation, said plunger having seats for contactors to cooperate with all of said base contacts, and the central recess of said base having clearance for said plunger contactors to permit said plunger together with its contactors to be freely inserted into said base and to be reciprocated in the latter.

3. In an electric switch, the combination with a molded contact-carrying insulating base of one-piece construction having a central recess open at one end and also having side recesses for accommodation of two pairs of contacts on each side of a plane coincident with the longitudinal axis of said central recess, said side recesses permitting the contacts to be inserted from outside the base and to be projected into said central recess and each of said side recesses providing for a plurality of contacts opposed seats spaced one from another longitudinally of said base, of a molded contactor-carrying insulating plunger of one-piece construction fitting into the central recess of said base for reciprocation therein and prevention of relative rotation, said plunger having side recesses open to freely receive contactors to cooperate with all of said base contacts, and the central recess of said base having clearance for said plunger contactors while its walls confine said contactors to the side recesses of said plunger.

4. In an electric switch, the combination with a molded contact-carrying insulating base of one-piece construction having a central recess open at one end and also having side recesses for accommodation of two pairs of contacts on each side of a plane coincident with the longitudinal axis of said central recess, said side recesses permitting the contacts to be inserted from outside the base and to be projected into said central recess and each of said side recesses providing for a plurality of contacts opposed seats spaced one from another longitudinally of said base, of a molded contactor-carrying insulating plunger of one-piece construction fitting into the central recess of said base for reciprocation therein and prevention of relative rotation, said plunger having seats for contactors to cooperate with all of said base contacts, the central recess of said base having clearance for said plunger contactors to permit said plunger together with its contactors to be freely inserted into said base and to be reciprocated in the latter, and a helical spring of conical form seated in the closed end of the central recess of said base to bear against the end of said plunger to bias said plunger outwardly.

5. In an electric switch, in combination, a one-piece molded insulating base having a central recess, a contact insertable through a wall of said base for projection into said central recess and having outside operable securing means, a one-piece molded insulating plunger reciprocable in the central recess of said base but interlocked with said base to prevent relative rotation, a spring interposed between said base and said plunger tending to eject the latter, a contactor carried by said plunger for cooperation with said base contact, said plunger together with its contactor being freely insertable into said base recess, and said base contact when inserted and secured co-acting with said plunger contactor to hold said plunger and said base in assembled relation while permitting reciprocation of said plunger.

6. In an electric switch, in combination, a one-piece base of hot-molded insulation, said base having a recess opening to one end thereof, a plurality of pairs of contacts, the contacts of each pair being respectively insertable through opposed walls of said base for projection into said base recess and having securing means accessible exteriorly of said base, a one-piece plunger of hot-molded insulation reciprocable in said base recess but cooperatively shaped with respect to the latter to prevent relative rotation of said parts, a coiled spring of substantially cone-shape interposed under a predetermined degree of compression between the bottom wall of said base recess and said plunger, at least one pair of contactors carried by said plunger for cooperation with said base contacts, the contactors of each pair having a coiled spring interposed under a predetermined degree of compression therebetween to normally effect separation thereof from each other, said plunger together with its associated contactors being freely insertable into said base recess, and certain of said base contacts when inserted and secured co-acting with said plunger contactors to hold said plunger and said base in assembled relation while permitting a predetermined degree of reciprocating movement of said plunger.

7. In an electric switch, in combination, a one-piece molded insulating base having a central recess, contacts insertable through opposite walls of said base for projection into said central recess and having outside operable securing means, a one-piece molded insulating plunger reciprocable in the central recess of said base but interlocked with said base to prevent relative rotation, a spring interposed between said base and said plunger tending to eject the latter, a contactor carried by said plunger to cooperate with and to bridge said base contacts, said plunger with its contactor assembled thereon being freely insertable into said base, and said base contacts when inserted and secured coacting with said plunger contactor to hold said plunger and said base in assembled relation while permitting reciprocation of said plunger.

8. In an electric switch, in combination, a one-piece molded insulating base having a central recess, pairs of contacts insertable through opposed walls of said base for projection into said central recess and having outside operable securing means, the contacts of said pairs being spaced from one another axially of said central recess, a one-piece molded insulating plunger reciprocable in the central recess of said base but interlocked with said base to prevent relative rotation, a coiled compression spring interposed between said base and said plunger tending to eject the latter, and a pair of contactors with an interposed spring seated in an open side recess in said plunger to cooperate with said base contacts, each of said contactors affording a bridge for corresponding contacts of two pairs of base contacts, said plunger with its contactors being freely insertable into and removable from said base when certain of said base contacts are removed, and the last mentioned base contacts when inserted and secured coacting with said plunger contactors to hold said plunger in assembled relation with said base while permitting reciprocation of said plunger.

9. In an electric switch, in combination, a one-piece molded insulating base having a central recess, pairs of contacts insertable through opposite walls of said base for projection into said central recess and having outside operable securing means, said base accommodating four pairs of contacts, two pairs on either side of a plane coincident with the axis of said recess, a one-piece molded insulating plunger reciprocable in the central recess of said base but interlocked with said base to prevent relative rotation, said plunger having on opposite sides thereof open recesses, pairs of contactors with interposed springs mounted in the side recesses of said plunger, said plunger with its contactors being freely insertable into and removable from said base when certain of said base contacts are removed, and the last mentioned base contacts when inserted and secured coacting with said plunger contactors to hold said plunger and said base in assembled relation while permitting said plunger to be reciprocated.

10. In an electric switch, in combination, a one-piece molded insulating base having a recess formed therein and opening to the upper end thereof, a one-piece molded insulating plunger insertable downwardly into said recess and guided by the walls of the latter for reciprocatory movement, a coiled compression spring interposed between the bottom wall of said recess and said plunger and tending to move the latter upwardly to a given position relatively to said recess, said plunger having a notch opening to one side thereof, a bridging contactor having its body portion positioned within said notch, a coiled compression spring interposed between the bottom wall of said notch and said contactor to normally bias the latter toward the upper end wall of said notch, a pair of stationary contacts insertable into said recess substantially below the upper end thereof and respectively adapted to overlie the opposite end portions of said contactor, said first mentioned spring acting through said plunger to normally effect movement of said contactor into engagement with said contacts, and said contacts acting through said contactor against said plunger to limit the upward movement of the latter.

11. In an electric switch, in combination, a one-piece molded insulating base having a recess formed therein and opening to the upper end thereof, a one-piece molded insulating plunger insertable downwardly into said recess and guided by the walls of the latter for reciprocatory movement, a coiled compression spring interposed between the bottom wall of said recess and said plunger and tending to move the latter upwardly to a given position, said plunger having a notch formed therein and opening to one side thereof, a bridging contactor positioned within said notch, a coiled compression spring interposed between the bottom wall of said notch and said contactor to normally bias the latter toward the upper end wall of said notch, a pair of combined stationary contact and terminal members having their contact portions insertable into said recess substantially below the upper end thereof and respectively adapted to overlie the opposite end portions of said contactor, the terminal portions of said members being exposed exteriorly of said base to provide for wiring of the switch, said first mentioned spring acting through said plunger to normally effect movement of said contactor into engagement with said contact portions of said members, and said contact portions acting through said contactor against said plunger to limit the upward movement of the latter.

12. In an electric switch, in combination, a one-piece molded insulating base of substantially rectangular box-like contour, said base having a recess formed therein and opening to the upper end thereof, the lower portion of said recess being cruciform in transverse cross section, an intermediate portion of said recess being of substantially square form in transverse cross section, and an upper portion of said recess being of substantially circular form in transverse cross section, said base having opposed upper and lower ledges formed thereon at each of the four corners thereof, the intermediate portion of said recess opening to all of said ledges, a coiled compression spring having its lower end seated against the bottom wall of said recess, and a one-piece molded insulating plunger freely insertable into said recess and adapted to rest against the upper end of said spring, said plunger having a portion of cruciform transverse cross section for guiding thereof by the walls of said recess, said plunger having a relatively thin, flat portion formed integrally with said portion of cruciform and extending laterally beyond the respective arms of the latter, stationary contacts attachable in pairs to the upper and lower ledges on said base, at least one pair of upper and lower contactors carried by said plunger, and the upper contactor of a pair cooperating with its associated pair of upper stationary contacts to positively limit the outward movement of said plunger.

13. In an electric switch, in combination, a one-piece molded insulating base of substantially rectangular box-like contour, said base having a recess formed therein and opening to the upper end thereof, the lower portion of said recess being cruciform in transverse cross section, an intermediate portion of said recess being of substantially square form in transverse cross section, and an upper portion of said recess being of substantially circular form in transverse cross section, said base having opposed upper and lower ledges formed thereon at each of the four corners thereof, the intermediate portion of said recess opening to all of said ledges, a coiled compression spring having its lower end seated against the bottom wall of said recess, and a one-piece molded insulating plunger freely insertable into said recess and adapted to rest against the upper end of said spring, said plunger being cruciform in transverse cross section throughout the major portion of its length for guiding thereof by the walls of said recess, said plunger having a relatively thin, flat portion formed integrally with said portion of cruciform and extending laterally beyond the respective arms of the latter, stationary contacts attachable in pairs to the upper and lower ledges on said base, at least one pair of upper and lower contactors carried by said plunger, the upper contactor of a pair cooperating with its associated pair of upper stationary contacts to limit the outward movement of said plunger, the contactors of each pair having a coiled compression spring interposed therebetween, said plunger having laterally opening notches in opposite arms thereof to accommodate the respective pairs of contactors, and the walls of each of said notches being spaced to afford a predetermined degree of lost motion of said plunger relative to either of its associated contactors as an incident to engagement of the latter with its cooperating stationary contacts.

14. In an electric switch, in combination, a one-piece molded insulating base of substantially rectangular contour, said base having a recess formed therein and opening to the upper end thereof, the lower portion of said recess being cruciform in transverse cross section, an intermediate portion of said recess being of substantially square form in transverse cross section, and an upper portion of said recess being of substantially circular form in transverse cross section, said base having opposed upper and lower ledges formed thereon at each of the four corners thereof, the intermediate portion of said recess opening to all of said ledges, a coiled compression spring having its lower end seated against the bottom wall of said recess, and a one-piece molded insulating plunger freely insertable into said recess and adapted to rest against the upper end of said spring, a portion of said plunger being cruciform in transverse cross section for guiding thereof by the walls of said recess, said plunger having a relatively thin, flat portion formed integrally with said portion of cruciform and extending laterally beyond the respective arms of the latter, stationary contacts attachable in pairs to the upper and lower ledges on said base, at least one pair of upper and lower contactors carried by said plunger, the upper contactor of a pair cooperating with its associated pair of upper stationary contacts to limit the outward movement of said plunger, the contactors of each pair having a coiled compression spring interposed therebetween, said plunger having laterally opening notches in opposite arms thereof to accommodate the respective pairs of contactors, the walls of each of said notches being spaced to afford a predetermined degree of lost motion of said plunger relative to either of its associated contactors as an incident to engagement of the latter with its cooperating stationary contacts, said plunger having an integral upward extension of substantially rectangular form in transverse cross section said extension having a peripheral groove formed therein, a spring ring interlocked with said groove, a pushbutton having a recess to slidably fit said plunger extension, said ring cooperating with the walls of said last mentioned recess to frictionally hold said pushbutton in assembled position, said pushbutton having laterally extending flange portions at the lower end thereof, and said upper substantially circular portion of said base recess cooperating with said flange portions to afford reciprocating clearance for said pushbutton.

15. As an article of manufacture, a one-piece molded insulating plunger for electric switches of the reciprocating contactor type, a portion of said plunger being cruciform in transverse cross section, said plunger having relatively thin, flat portions formed integrally with the arms of said cruciform portion at the upper end of the latter and extending transversely beyond the respective arms, said plunger having a centrally located upward extension of substantially rectangular form in transverse cross section, said extension being formed to provide a peripheral groove adjacent to the upper end thereof, a split spring ring of circular form forcibly insertable into said groove and having portions normally extending slightly beyond the four sides of said extension, and a molded insulating pushbutton recessed to freely accommodate said plunger extension, said spring ring cooperating with the side walls of said pushbutton recess to normally frictionally hold the latter in properly assembled relationship to said plunger.

16. As an article of manufacture, a one-piece molded insulating plunger for an electric switch, a portion of said plunger being cruciform in transverse cross section, said plunger having relatively thin, flat portions formed integrally with the arms of said cruciform portion at the upper end of the latter and extending transversely beyond the respective arms, said plunger having a centrally located upward extension of substantially rectangular form in transverse cross section, said extension being formed to provide a peripheral groove adjacent to the upper end thereof, a spring ring of circular form having overlapping ends forcibly insertable into said groove and having portions normally extending slightly beyond the four sides of said extension, a molded insulating pushbutton recessed to freely accommodate said plunger extension, said spring ring cooperating with the side walls of said pushbutton recess to normally frictionally hold the latter in properly assembled relationship to said plunger, at least one pair of oppositely extending arms of the cruciform portion of said plunger having substantially rectangular notches formed intermediate their length and opening to the outer edges thereof, each of said notches being adapted to accommodate a pair of upper and lower bridging contactors with a coiled spring interposed therebetween, and the upper and lower walls of each notch being spaced to normally provide for separation of the upper and lower contactors of each pair under the bias of their associated spring.

17. In an electric switch, in combination, a pair of punched and stamped sheet metal contactor members of identical form, each of said members having end portions located in a common plane and a flat intermediate portion offset from the plane of said end portions, said members being reversely arranged in superimposed relation with the intermediate portions thereof normally spaced from each other, and a coiled compression spring interposed between said intermediate portions to normally bias said contactors bodily from each other.

18. In an electric switch of the reciprocating contactor type, in combination, a pair of punched and stamped sheet metal contactor members of identical form, each of said members having end portions located in a common plane and a flat intermediate portion offset from the plane of said end portions, said members being reversely arranged in superimposed relation with the intermediate portions thereof normally spaced from each other, a coiled compression spring interposed between said intermediate portions to normally bias said contactors bodily from each other, and a molded insulating plunger having a laterally opening notch formed therein into which said pair of contactors and their associated spring may be inserted as a unit, the upper and lower walls of said notch being sufficiently spaced to normally provide for a predetermined degree of separation of said contactors under the bias of said spring.

19. In an electrical switch, in combination, a pair of punched and stamped sheet metal contactor members of identical form, each of said members having end portions located in a common plane and a flat intermediate portion offset from the plane of said end portions, said members being reversely arranged in superimposed relation with the intermediate portions thereof normally spaced from each other, a coiled compression spring interposed between said intermediate portions to normally bias said contactors bodily from each other, a molded insulating plunger having a laterally opening notch formed therein into which said pair of contactors and their associated spring may be inserted as a unit, the upper and lower walls of said notch being sufficiently spaced to normally provide for a predetermined degree of separation of said contactors under the bias of said spring, said plunger having a relatively narrow rib extending lengthwise thereof above and below said notch for sliding engagement with the walls of a groove in a suitable insulating base, and the intermediate portions of said members having integral rectangular lugs located in the respective planes thereof and respectively alined with said rib in the assembled positions of said parts.

20. As an article of manufacture, a one-piece molded insulating base for an electric switch, said base having a main body portion of substantially rectangular contour, said body portion being of greater transverse length than width and of greater vertical height than said transverse length, said base having a pair of integral lateral portions extending throughout the length of two opposed sides of said body portion and respectively projecting above and below the latter, and said lateral portions having bolt passages extending therethrough with countersinks at opposite ends of said passages, whereby said base is adapted for attachment of either the lower or upper end thereof to a suitable support.

21. As an article of manufacture, a one-piece molded insulating base for electric switches of the reciprocating contactor type, said base having a main body portion of substantially rectangular contour, said body portion being of greater transverse length than width and of greater vertical height than said transverse length, said base having a pair of integral lateral portions extending throughout the length of two opposed sides of said body portion and respectively projecting above and below the latter, said lateral portions having bolt passages extending therethrough with countersinks at opposite ends of said passages, whereby said base is adapted for attachment of either the lower or upper end thereof to a suitable support, said base having a recess formed therein and opening to the upper end thereof, said recess comprising a lower portion of cruciform, an intermediate portion of rectangular form and an upper portion of substantially circular form, said base having openings formed intermediate of its height at each of the four corners thereof to provide opposed upper and lower ledges respectively located in common planes and communicating with said recess, and said base having readily accessible screw passages formed therein and leading to the respective ledges to provide for individual attachment of combined contact and terminal members to any or all of the latter with the contact portions of said members located within said recess and the terminal portions located exteriorly of said base.

22. In an electric switch, in combination, a one-piece molded insulating base, said base having a main body portion of substantially rectangular contour, said body portion being of greater transverse length than width and of greater vertical height than said transverse length, said base having a pair of integral lateral portions extending throughout the height of the opposed narrower sides and respectively projecting above and below said main body portion, said lateral portions having bolt passages extending therethrough, whereby said base is adapted for attachment of either the lower or upper end thereof to a suitable support, said base having a recess formed therein and opening to the upper end thereof, said recess comprising a cruciform lower portion, an intermediate substantially rectangular portion and a substantially circular upper portion, said base having openings formed intermediate its height at each of the four corners thereof to provide opposed upper and lower ledges respectively in common planes and communicating with said recess, said base having screw passages formed therein and leading to the respective ledges to provide for individual attachment of stationary contact members to any or all of the latter, a one-piece molded insulating plunger having a portion of substantially cruciform, said plunger having notches formed in two of the oppositely extendings arms thereof, a pair of punched and stamped sheet metal contactors positioned in one of said notches, a coiled compression spring interposed between said contactors to normally bias the same toward the upper and lower walls of said notch, a coiled compression spring interposed between the bottom wall of said recess and said plunger to normally bias the latter outwardly from said recess, and the upper contactor of said pair cooperating with its associated contacts and said plunger to limit the degree of outward movement of the latter.

23. In an electric switch, in combination, a one-piece molded insulating base having a recess formed therein and opening to the upper end thereof, a one-piece molded insulating plunger insertable into said recess and restrained by the walls of the latter against rotation while permitting reciprocation thereof, a coiled spring interposed under a predetermined degree of compression between the bottom wall of said recess and said plunger, said plunger having notches spectively opening to opposite sides thereof, a bridging contactor positioned within one of said notches, a coiled spring interposed under a predetermined degree of compression between one wall of said last mentioned notch and said contactor to normally bias the latter toward the opposite wall of said notch, a pair of stationary contacts insertable laterally into said recess at a point intermediate the length thereof for cooperation with said contactor, a pair of contactors positioned within the other of said notches, said last mentioned contactors facing in opposite directions away from each other and having a coiled spring interposed under a predetermined degree of compression therebetween, two other pairs of contacts insertable laterally into said recess at spaced points intermediate the length thereof for cooperation with the respective contactors of said pair, a coiled spring interposed under a predetermined degree of compression between the contactors of said pair, and said first mentioned contactor and one of said pair of contactors being adapted to engage in sequence their respectively associated pairs of contacts upon movement of said plunger in one direction and to disengage said last mentioned pairs of contacts in the same sequence upon movement of said plunger in the opposite direction.

24. In an electric switch, in combination, a one-piece molded insulating base having a main recess opening to one end thereof and also having auxiliary corner recesses for accommodation of two pairs of stationary contacts on each side of a plane coincident with the longitudinal center line of said main recess, said corner recesses permitting the stationary contacts to be inserted laterally from the exterior of said base into said main recess and each corner recess providing for two contacts opposed seats spaced from one another longitudinally of said base, a one-piece molded contactor-carrying insulating plunger non-rotatably fitting into said main recess for reciprocation with respect thereto, said plunger having opposite side notches forming seats for two pairs of contactors to cooperate with all of said pairs of stationary contacts, said main recess providing clearance for said contactors to permit the latter to be freely inserted jointly with said plunger thereinto for reciprocation in said recess, said base having a plurality of bolt passages extending longitudinally therethrough, a punched sheet metal plate superimposed upon the upper end of said base, and means including bolts penetrating said passages for rigidly securing said plate in position, said plate having an opening formed therein to provide clearance for the upper end portion of said plunger.

25. In an electric switch, in combination, a one-piece molded insulating base having a main recess opening to one end thereof and also having auxiliary corner recesses for accommodation of two pairs of stationary contacts on each side of a plane coincident with the longitudinal center line of said main recess, said corner recesses permitting the stationary contacts to be inserted laterally from the exterior of said base into said main recess and each corner recess providing for two contacts opposed seats spaced from one another longitudinally of said base, a one-piece molded contactor-carrying insulating plunger non-rotatably fitting into said main recess for reciprocation with respect thereto, said plunger having opposite side notches forming seats for two pairs of contactors to cooperate with all of said pairs of stationary contacts, said main recess providing clearance for said contactors to permit the latter to be freely inserted jointly with said plunger thereinto for reciprocation in said recess, said base having a plurality of bolt passages extending longitudinally therethrough, a metal adapter member seated upon the upper end of said base, means including bolts associated with said adapter member and said passages to rigidly secure said base and said adapter member to each other, and a flat, punched sheet metal member interposed between and interlocked with said base and said adapter member, said last mentioned member having an opening formed therein to provide clearance for the upper end portion of said plunger.

26. In an electric switch, in combination, a one-piece molded insulating base having a main recess opening to one end thereof and also having auxiliary corner recesses for accommodation of two pairs of stationary contacts on each side of a plane coincident with the longitudinal center line of said main recess, said corner recesses permitting the stationary contacts to be inserted laterally from the exterior of said base into said main recess and each corner recess providing for two contacts opposed seats spaced from one another longitudinally of said base, a one-piece molded contactor-carrying insulating plunger non-rotatably fitting into said main recess for reciprocation with respect thereto, said plunger having opposite side notches forming seats for two pairs of contactors to cooperate with all of said pairs of stationary contacts, said main recess providing clearance for said contactors to permit the latter to be freely inserted jointly with said plunger thereinto for reciprocation in said recess, said plunger having an integral extension of substantially square form in transverse cross section at the outer end thereof, a pushbutton having a recess to freely accommodate said plunger extension, a spring ring interposed between said last mentioned parts to provide a frictional connection therebetween, said pushbutton having an outwardly extending peripheral flange adjacent the lower end thereof, a flat, punched sheet metal member superimposed upon the upper end of said base and overlying the flange of said pushbutton, said member having an opening to provide clearance for that portion of the pushbutton above said flange, a die cast metal adapter member superimposed upon said sheet metal member, said adapter member also having an opening formed therein to provide clearance for the upper portion of said pushbutton and to assist in guiding the latter, said base and said adapter member having pairs of alined bolt passages extending longitudinally therethrough, and means including a corresponding number of bolts cooperating with said alined bolt passages to provide for rigid securement of said base, said sheet metal member and said adapter member to each other.

27. In an electric switch, the combination with a one-piece molded insulating base of generally rectangular contour, said base having a pair of integral lateral extensions which project above and below the upper and lower ends of the main body portion of said base, each of said extensions having a through passage to accommodate a bolt whereby said base may be secured to a suitable support, said base having a central recess opening to the upper end thereof and also having a recess at each corner intermediate the length thereof, eight combined contact and terminal members so arranged as to provide for location of two pairs thereof on each side of a plane coincident with the longitudinal axis of said central recess, said corner recesses permitting the contact portions of said members to to be inserted from outside the base and to be projected into said central recess and each of said corner recesses providing for the contact portions of two of said members opposed seats spaced one from another longitudinally of said base, a one-piece molded insulating plunger fitting into said central recess for reciprocation therein and prevention of relative rotation, said plunger having a laterally opening recess on each of two opposite sides thereof, a pair of upper and lower bridging contactors within each of said recesses, a coiled spring interposed under compression between the contactors of each pair, said central recess having clearance for said contactors to permit said plunger with said pairs of contactors to be freely inserted thereinto prior to attachment of the two upper pairs of stationary contacts, a helical spring of conical form interposed between the lower end wall of said central recess and said plunger to bias the latter outwardly, the upper stationary contacts when attached acting through the contactors to limit outward movement of said plunger, the terminal portions of said members aforementioned being located within the transverse dimensions of said base with its extensions, the upper terminal portions having their binding screw heads accessible from above, and the lower terminal portions having their binding screw heads accessible from below.

CLYDE F. ROBBINS.

REFERENCES CITED

The following references are of record in the file of this patent:

UNITED STATES PATENTS

| Number | Name | Date |
|---|---|---|
| 1,208,575 | Kraemer | Dec. 12, 1916 |
| 1,307,006 | Hastings | June 17, 1919 |
| 1,690,052 | Carlson | Oct. 30, 1928 |
| 1,704,568 | Harrington | Mar. 15, 1929 |
| 1,820,876 | Wood | Aug. 25, 1931 |
| 1,854,049 | Liber | Apr. 12, 1932 |
| 2,160,635 | Arndt | May 30, 1939 |
| 2,242,165 | Batcheller | May 31, 1941 |
| 2,303,516 | Von Mehren | Dec. 1, 1942 |